(12) United States Patent
Katsuta et al.

(10) Patent No.: US 8,272,991 B2
(45) Date of Patent: Sep. 25, 2012

(54) POWER OUTPUT APPARATUS, HYBRID VEHICLE PROVIDED WITH THE SAME, AND CONTROL METHOD OF POWER OUTPUT APPARATUS

(75) Inventors: Hiroshi Katsuta, Toyota (JP); Hidehiro Oba, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 531 days.

(21) Appl. No.: 12/443,842

(22) PCT Filed: Oct. 9, 2007

(86) PCT No.: PCT/JP2007/069664
§ 371 (c)(1),
(2), (4) Date: Apr. 1, 2009

(87) PCT Pub. No.: WO2008/053671
PCT Pub. Date: May 8, 2008

(65) Prior Publication Data
US 2010/0029436 A1    Feb. 4, 2010

(30) Foreign Application Priority Data
Oct. 31, 2006  (JP) .................................. 2006-296483

(51) Int. Cl.
*B60W 10/02* (2006.01)
(52) U.S. Cl. ............................. 477/5; 475/5; 180/65.265
(58) Field of Classification Search .................. 701/22; 180/65.25, 65.265, 65.23, 65.21; 477/3, 477/5; 475/5
See application file for complete search history.

(56) References Cited

U.S. PATENT DOCUMENTS

| | | | | |
|---|---|---|---|---|
| 5,558,588 A | * | 9/1996 | Schmidt | 475/5 |
| 5,669,842 A | * | 9/1997 | Schmidt | 475/5 |
| 5,730,676 A | * | 3/1998 | Schmidt | 475/5 |
| 5,935,035 A | * | 8/1999 | Schmidt | 475/5 |

(Continued)

FOREIGN PATENT DOCUMENTS

EP    2 060 430 A1    5/2009

(Continued)

OTHER PUBLICATIONS

Extended EP Search Report of EP 07 82 9402.2 dated Apr. 19, 2011.

*Primary Examiner* — Katy M Ebner
*Assistant Examiner* — Emma K Frick
(74) *Attorney, Agent, or Firm* — Kenyon & Kenyon LLP

(57) ABSTRACT

In a hybrid vehicle, in order to stop an engine while a clutch is kept engaged and to transmit power from a motor to a drive shaft by changing a change speed state of a transmission when the power from a second motor is being transmitted to the drive shaft by the transmission, for example, a rotation speed of the first motor is adjusted so that the first motor can be connected to the drive shaft with the clutch disengaged while torque commands for both motors are set so that the power based on torque demand is outputted to the drive shaft, the power is transferred from the second motor to the first motor while both motors are connected to the drive shaft by the transmission, and the connection between the second motor and the drive shaft by the transmission is disconnected.

13 Claims, 17 Drawing Sheets

U.S. PATENT DOCUMENTS

| | | | |
|---|---|---|---|
| 6,090,005 A * | 7/2000 | Schmidt et al. | 475/5 |
| 6,902,512 B2 * | 6/2005 | Kamichi et al. | 477/108 |
| 7,024,299 B2 * | 4/2006 | Hubbard et al. | 701/54 |
| 7,128,675 B2 * | 10/2006 | Klemen et al. | 475/5 |
| 7,137,919 B2 * | 11/2006 | Holmes | 475/5 |
| 7,282,004 B2 * | 10/2007 | Raghavan et al. | 475/5 |
| 7,338,401 B2 * | 3/2008 | Klemen et al. | 475/5 |
| 2003/0166429 A1 * | 9/2003 | Tumback | 475/5 |
| 2004/0251064 A1 * | 12/2004 | Imai | 180/65.2 |
| 2004/0251862 A1 * | 12/2004 | Imai | 318/376 |
| 2005/0072609 A1 * | 4/2005 | Eisenhardt et al. | 180/65.3 |
| 2005/0227803 A1 * | 10/2005 | Holmes | 475/204 |
| 2006/0142104 A1 * | 6/2006 | Saller | 475/5 |
| 2006/0154772 A1 * | 7/2006 | Schmidt et al. | 475/5 |
| 2006/0183588 A1 * | 8/2006 | Schmidt et al. | 475/5 |

FOREIGN PATENT DOCUMENTS

| | | |
|---|---|---|
| JP | 2003-106389 A | 4/2003 |
| JP | 2005-008005 A | 1/2005 |
| JP | 2005-125876 A | 5/2005 |
| JP | 2005-151699 A | 6/2005 |
| JP | 2005-155891 A | 6/2005 |
| JP | 2006-194412 A | 7/2006 |

* cited by examiner

POWER OUTPUT APPARATUS, HYBRID VEHICLE PROVIDED WITH THE SAME, AND CONTROL METHOD OF POWER OUTPUT APPARATUS

This is a 371 national phase application of PCT/JP2007/069664 filed 9 Oct. 2007, claiming priority to Japanese Patent Application No. JP 2006-296483 filed 31 Oct. 2006, the contents of which are incorporated herein by reference.

TECHNICAL FIELD

The present invention relates to a power output apparatus, hybrid vehicle provided with the same, and control method of power output apparatus.

BACKGROUND ART

A power output apparatus provided with an internal combustion engine, two motors, a so-called Ravigneaux-type planetary gear mechanism, and a parallel-shaft type transmission which can selectively connect two output elements of the planetary gear mechanism to an output shaft has been known as this type of power output apparatus (See Patent Document 1, for example). The power output apparatus is intended for a front-wheel-drive vehicle, and in the power output apparatus, the internal combustion engine is arranged laterally, and rotating shafts of the internal combustion engine and the planetary gear mechanism as well as the two motors and the parallel-shaft type transmission are extended in parallel with each other. Also, those including a planetary gear device including an input element connected to the internal combustion engine and two output elements and a parallel-shaft type transmission including a counter shaft connected to the corresponding output elements of the planetary gear mechanism are known (See Patent Document 2, for example). In the power output apparatus, the two output elements of the planetary gear device are fixed to an inner circumference of a corresponding rotor, respectively, of an electric driving portion.

[Patent Document 1] Japanese Patent Laid-Open No. 2005-155891

[Patent Document 2] Japanese Patent Laid-Open No. 2003-106389

DISCLOSURE OF THE INVENTION

The power output apparatus described in each of the above Patent Documents enables stop of the internal combustion engine and transmitting power outputted from either one of the motors with change in a speed ratio to the output shaft by a transmission. However, either of the Patent Documents does not specifically disclose how motor operation to output power only by the motor is carried out at all.

The present invention has an object to provide a power output apparatus which can transmit power outputted from a motor efficiently to a drive shaft with change in a change speed state of a transmission mechanism, a hybrid vehicle provided with the same, and a control method of the power output apparatus.

At least part of the above and the other related demands is attained by a power output apparatus, hybrid vehicle provided with the same, and control method of power output apparatus having the configurations discussed below.

The present invention is directed to a power output apparatus for outputting power to a drive shaft. The power output apparatus includes: an internal combustion engine; a first motor capable of inputting and outputting power; a second motor capable of inputting and outputting power; an accumulator unit capable of exchanging electric power with each of the first and second motors; a power distribution and integration mechanism having a first element connected to a rotating shaft of the first motor, a second element connected to a rotating shaft of the second motor, and a third element connected to an engine shaft of the internal combustion engine and constituted so that the three elements are capable of mutually differential rotation; a connecting/disconnecting unit capable of a driving source-element connection and a disconnection of the driving source-element connection, the driving source-element connection being any one of a connection between the first motor and the first element, a connection between the second motor and the second element, and a connection between the internal combustion engine and the third element; a transmission mechanism capable of selectively connecting either one or both of the rotating shaft of the first motor and the rotating shaft of the second motor to the drive shaft and of transmitting the power from the first motor and the power from the second motor to the drive shaft at respective predetermined speed ratios; a power demand setting module for setting power demand, which is power required for the drive shaft; and a transmission control module for controlling the first and second motors, the connecting/disconnecting unit, and the transmission mechanism so that power based on the set power demand is outputted to the drive shaft, the transmission control module, when the internal combustion engine is stopped, the driving source-element connection is made so that only one of the first and second motors is connected to the drive shaft by the transmission mechanism and the power is outputted by one of the first and second motors, capable of controlling the first and second motors, the connecting/disconnecting unit, and the transmission mechanism so that only the other of the first and second motors is connected to the drive shaft by the transmission mechanism and the power is outputted by the other of the first and second motors while performing the disconnection of the driving source-element connection, a rotation speed adjustment process for adjusting a rotation speed of the other of the first and second motors so that the other of the first and second motors can be connected to the drive shaft while the driving source-element connection is disconnected, a power transfer process for transferring the power from one of the first and second motors to the other while both of the first and second motors are connected to the drive shaft by the transmission mechanism, and a disconnection of the connection between one of the first and second motors and the drive shaft by the transmission mechanism.

The power output apparatus can transmit power from either of the first and the second motors to the drive shaft with a change speed at a predetermined speed ratio by the transmission mechanism when the internal combustion engine is stopped while the driving source-element connection is made and only one of the first and second motors is connected to the drive shaft by the transmission mechanism. In this state, if the connection between one of the first and second motors and the drive shaft is disconnected and only the other of the first and second motors is connected to the drive shaft by the transmission mechanism so as to output the power, the power from the other of the first and second motors can be transmitted to the drive shaft by the transmission mechanism at a predetermined speed ratio. In the power output apparatus, if the change speed state of the transmission mechanism is changed and the power from the other of the first and second motors is to be transmitted to the drive shaft when the power from one of the first and second motors is being transmitted to the drive shaft while the driving source-element connection is made as above, first, the driving source-element connection by the connecting/disconnecting unit is disconnected. Then the rotation speed adjusting process in which the rotation speed of the other of the first and second motors is adjusted so that the other of the first and second motors can be connected to the drive shaft and the power transfer process for transferring the power from the one to the other of the first and second motors while both the first and second motors are connected to the drive shaft by the transmission mechanism are executed while the driving source-element connection is disconnected and the power based on the set power demand is outputted to the drive shaft, and the connection between one of the first and second motors and the drive shaft by the transmission mechanism is disconnected. By this operation, the other of the first and second motors is connected to the drive shaft, and the power from the other of the first and second motors can be transmitted to the drive shaft with the change speed by the transmission mechanism. As a result, in the power output apparatus, the power outputted from the first and the second motors can be efficiently transmitted to the drive shaft with change in the change speed state of the transmission mechanism.

In one preferable application of the power output apparatus of the invention, the transmission control module controls the first and second motors, the connecting/disconnecting unit, and the transmission mechanism so that the power based on the set power demand is outputted to the drive shaft while performing a second rotation speed adjustment process for adjusting a rotation speed of one of the first and second motors disconnected from the drive shaft so as to enable the driving source-element connection, and the driving source-element connection in addition to the rotation speed adjustment process, the power transfer process, and the disconnection of the connection between one of the first and second motors and the drive shaft by the transmission mechanism. As mentioned above, after the connection between one of the first and second motors and the drive shaft is disconnected and the output of the power from the motor is stopped, if the second rotation speed adjusting process for adjusting the rotation speed of one of the first and second motors which has been disconnected from the drive shaft so that the driving source-element connection is enabled and the driving source element connection are executed while the power on the basis of the set power demand is outputted to the drive shaft, the internal combustion engine can be started rapidly by cranking the internal combustion engine by one of the first and second motors when the power is being outputted from the other of the first and second motors to the drive shaft through the transmission mechanism.

In another preferable application of the power output apparatus of the invention, the power transfer process is a process for decreasing the power from one of the first and second motors and increasing the power from the other of the first and second motors so that the power outputted from one of the first and second motors becomes a value 0 and the power outputted from the other of the first and second motors becomes a value based on the power demand and a target speed ratio which is a speed ratio of the transmission mechanism after the connection between one of the first and second motors and the drive shaft has been disconnected at a point of time when a predetermined transfer time has elapsed since a start of the power transfer process.

In still another preferable embodiment of the power output apparatus of the invention, the power transfer process is a process for setting a torque command to the first and second motors based on the power outputted by the first and second motors, the power demand set by the power demand setting module and the target speed ratio so that the power based on the set power demand is outputted to the drive shaft all the time during the power transfer process and the transfer of the power is completed within the transfer time. Thus, even if the power demand fluctuates during execution of the power transfer process, the power can be transferred between the first and second motors while surely outputting the power based on the power demand set by the power demand setting module to the drive shaft.

In still another preferable embodiment of the power output apparatus of the invention, the power transfer process is a process for setting a torque command to the first and second motors based on the power outputted by the first and second motors at the start of the power transfer process, the power demand at the start of the power transfer process and the target speed ratio so that the transfer of the power is completed within the transfer time. Thus, the power can be transferred between the first and second motors while restricting fluctuation of power outputted to the drive shaft caused by a difference or the like in response to the torque command between the first motor and the second motor.

In still another preferable embodiment of the power output apparatus of the invention, the transmission mechanism is a parallel-shaft type transmission including a first transmission mechanism having at least one set of parallel-shaft gear train that can connect either one of the first and second elements of the power distribution and integration mechanism to the drive shaft and a second transmission mechanism having at least one set of parallel-shaft gear train that can connect the rotating shaft of the first or second motor corresponding to the other of the first and second elements to the drive shaft. According to the transmission mechanism, which is such a parallel-shaft transmission, either one or both of the rotating shaft of the first motor and the rotating shaft of the second motor can be selectively connected to the drive shaft.

In still another preferable embodiment of the power output apparatus of the invention, the transmission mechanism is a planetary gear type transmission including a first planetary gear mechanism for transmission having an input element connected to either one of the first and second elements of the power distribution and integration mechanism, an output element connected to the drive shaft, and a fixable element and constituted so that these three elements are capable of mutually differential rotation, a first fixing mechanism capable of unrotatably fixing the fixable element of the first planetary gear mechanism, a second planetary gear mechanism for transmission having an input element connected to the rotating shaft of the first or second motor corresponding to the other of the first and second elements, an output element connected to the drive shaft, and a fixable element and constituted so that these three elements are capable of mutually differential rotation, and a second fixing mechanism capable of unrotatably fixing the fixable element of the second planetary gear mechanism for transmission. According to the transmission mechanism, which is such a planetary gear mechanism for transmission, either one of the rotating shaft of the first motor and the rotating shaft of the second motor can be connected to the drive shaft by bringing either one of the first and second fixing mechanisms into a fixed state. Also, both the rotating shaft of the first motor and the rotating shaft of the second motor can be connected to the drive shaft by bringing both the first fixing mechanism and the second fixing mechanism into the fixed state.

In still another preferable embodiment of the power output apparatus of the invention, the transmission mechanism further includes a connecting/disconnecting mechanism for transmission capable of a connection between the output element of either one of the first planetary gear mechanism for transmission and the second planetary gear mechanism for transmission and the fixable element and a disconnection of the connection. According to such a transmission mechanism, both the rotating shaft of the first motor and the rotating shaft of the second motor can be connected to the drive shaft by connecting the output element of the first or second planetary gear mechanism for transmission corresponding to the connecting/disconnecting mechanism for transmission and the fixable element by the connecting/disconnecting mechanism for transmission and by fixing the fixable element of the second or first planetary gear mechanism for transmission not corresponding to the connecting/disconnecting mechanism for transmission unrotatably. Also, according to this transmission mechanism, each element of the first or second planetary gear mechanism for transmission corresponding to the connecting/disconnecting mechanism for transmission is substantially locked by the connecting/disconnecting mechanism and integrally rotated so that the power from either of the rotating shaft of the first motor and the rotating shaft of the second motor is directly transmitted to the drive shaft by making the fixable element of the second or first planetary gear mechanism not corresponding to the connecting/disconnecting mechanism rotatable while the output element of the first or second planetary gear mechanism corresponding to the connecting/disconnecting mechanism is connected to the fixable element and the fixable element of the second or first planetary gear mechanism for transmission not corresponding to the connecting/disconnecting mechanism is fixed unrotatably.

The present invention is also directed to a hybrid vehicle including a drive wheel driven by power from a drive shaft. The hybrid vehicle includes: an internal combustion engine; a first motor capable of inputting and outputting power; a second motor capable of inputting and outputting power; a accumulator unit capable of exchanging electric power with each of the first and second motors; a power distribution and integration mechanism having a first element connected to a rotating shaft of the first motor, a second element connected to a rotating shaft of the second motor, and a third element connected to an engine shaft of the internal combustion engine and constituted so that these three elements are capable of mutually differential rotation; a connecting/disconnecting unit capable of a driving source-element connection and disconnection of the driving source-element connection, the driving source-element connection being any one of a connection between the first motor and the first element, a connection between the second motor and the second element, and a connection between the internal combustion engine and the third element; a transmission mechanism capable of selectively connecting either one or both of the rotating shaft of the first motor and the rotating shaft of the second motor to the drive shaft and of transmitting the power from the first motor and the power from the second motor to the drive shaft at respective predetermined speed ratios; a power demand setting module for setting power demand, which is power required for the drive shaft; and a transmission control module for controlling the first and second motors, the connecting/disconnecting unit, and the transmission mechanism so that power based on the set power demand is outputted to the drive shaft, the transmission control module, when the internal combustion engine is stopped, the driving source-element connection is made so that only one of the first and second motors is connected to the drive shaft by the transmission mechanism and the power is outputted by one of the first and second motors, capable of controlling the first and second motors, the connecting/disconnecting unit, and the transmission mechanism so that only the other of the first and second motors is connected to the drive shaft by the transmission mechanism and the power is outputted by the other of the first and second motors while performing the disconnection of the driving source-element connection, a rotation speed adjustment process for adjusting a rotation speed of the other of the first and second motors so that the other of the first and second motors can be connected to the drive shaft while the driving source-element connection is disconnected, a power transfer process for transferring the power from one of the first and second motors to the other while both of the first and second motors are connected to the drive shaft by the transmission mechanism, and a disconnection of the connection between one of the first and second motors and the drive shaft by the transmission mechanism.

In the hybrid vehicle, the power outputted from the motor is speed-changed by the transmission mechanism so that the power demand can be efficiently transmitted to the drive shaft, thereby improving fuel consumption and running performance of the hybrid vehicle.

The present invention is also directed to a control method of a power output apparatus. The power output apparatus includes a drive shaft, an internal combustion engine, first and second motors respectively capable of inputting and outputting power, an accumulator unit capable of exchanging electric power with each of the first and second motors, a power distribution and integration mechanism having a first element connected to a rotating shaft of the first motor, a second element connected to a rotating shaft of the second motor, and a third element connected to an engine shaft of the internal combustion engine and constituted so that these three elements are capable of mutually differential rotation, a connecting/disconnecting unit capable of a driving source-element connection and a disconnection of the driving source-element connection, the driving source-element connection being any one of a connection between the first motor and the first element, a connection between the second motor and the second element, and connection between the internal combustion engine and the third element, a transmission mechanism capable of selectively connecting either one or both of the rotating shaft of the first motor and the rotating shaft of the second motor to the drive shaft and of transmitting the power from the first motor and the power from the second motor to the drive shaft at respective predetermined speed ratios. The control method including steps of: (a) when the internal combustion engine is stopped, the driving source-element connection is made so that only one of the first and second motors is connected to the drive shaft by the transmission mechanism and the power is outputted by one of the first and second motors, disconnecting the driving source-element connection; (b) adjusting a rotation speed of the other of the first and second motors so that the other of the first and second motors can be connected to the drive shaft while the driving source-element connection is disconnected; (c) transferring the power from one of the first and second motors to the other while both the first and second motors are connected to the drive shaft by the transmission mechanism; and (d) disconnecting the connection between one of the first and second motors to the drive shaft by the transmission mechanism.

According to the control method of the power output apparatus, the power outputted from the first or second motor can be efficiently transmitted to the drive shaft with change in the change speed state of the transmission mechanism.

In one preferable application of the control method of the power output apparatus of the invention, the method further including steps after the step (d): (e) adjusting the rotation speed of one of the first and second motors disconnected from the drive shaft so as to enable the driving-source element connection; and (f) performing the driving source-element connection.

In another preferable application of the control method of the power output apparatus of the invention, a torque command to the first and second motors is set so that power based on power demand required for the drive shaft is outputted during steps (a) to (f).

In still another preferable application of the control method of the power output apparatus of the invention, step (c) decreases the power from one of the first and second motors and increasing the power from the other of the first and second motors so that the power outputted from one of the first and second motors becomes the value 0 and the power outputted from the other of the first and second motors becomes a value based on the power demand and a target speed ratio which is a speed ratio of the transmission mechanism after connection between one of the first and second motors and the drive shaft is disconnected at a point of time when a predetermined transfer time has elapsed since a start of step (c). In this case, step (c) may set a torque command to the first and second motors based on the power outputted from the first and second motors, the power demand and the target speed ratio so that the power based on the power demand is outputted to the drive shaft all the time of step (c) and the transfer of power is completed within the transfer time. Further, step (c) may set a torque command to the first and second motors so that the transfer of power is completed within the transfer time based on the power outputted from the first and second motors at the start of step (c), the power demand at the start of step (c) and the target speed ratio.

BEST MODE FOR CARRYING OUT THE INVENTION

Next, a best mode for carrying out the present invention will be described using an embodiment.

Figure 1:
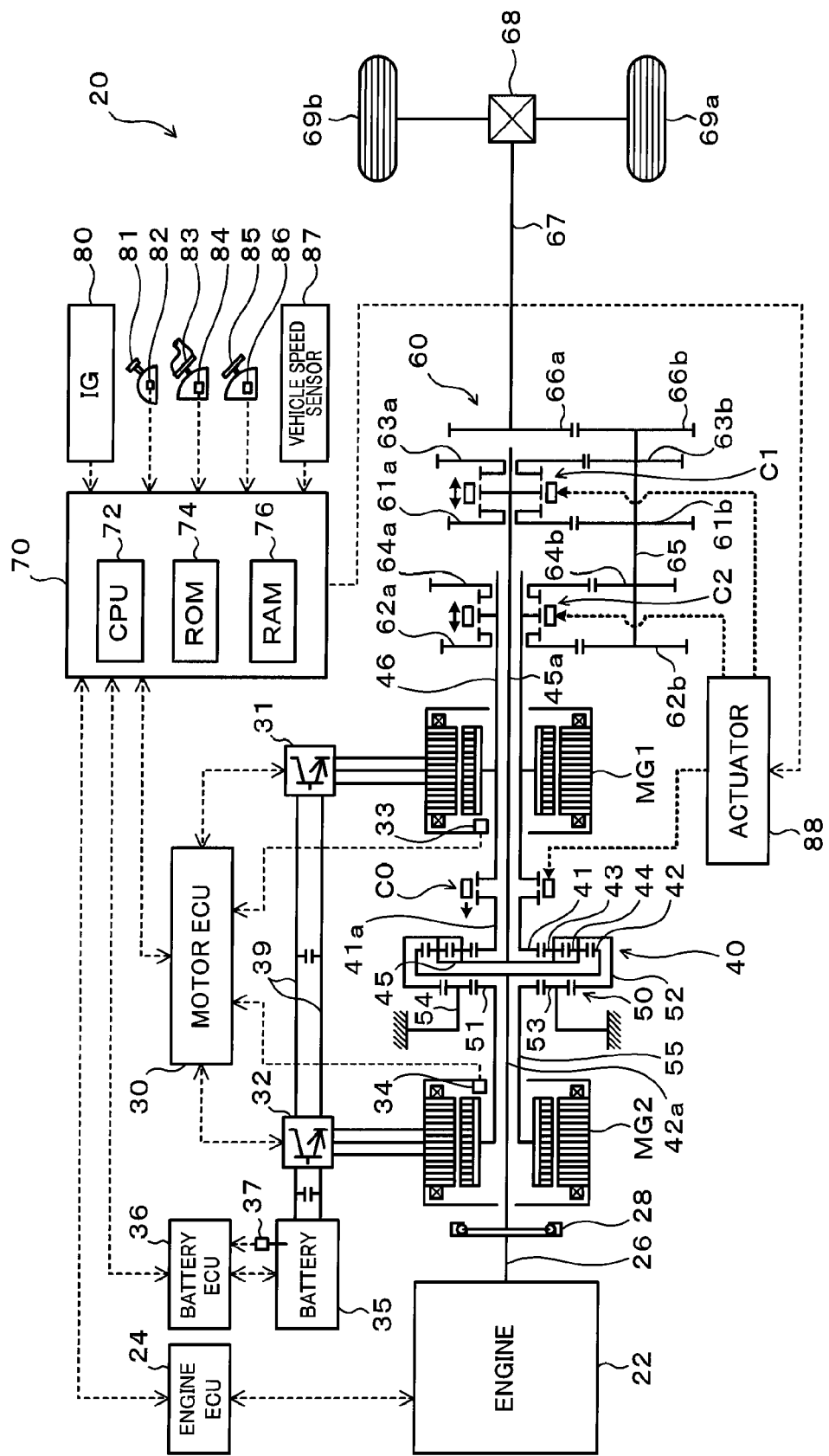
FIG. 1 is a schematic block diagram of a hybrid vehicle 20 according to an embodiment of the present invention.

FIG. 1 is a schematic block diagram of a hybrid vehicle 20 according to the embodiment of the present invention. The hybrid vehicle 20 shown in the figure is constructed as a rear drive vehicle and is provided with an engine 22 arranged in the front of the vehicle, a power distribution and integration mechanism (differential rotating mechanism) 40 connected to a crankshaft 26, which is an output shaft of the engine 22, a motor MG1 connected to the power distribution and integration mechanism 40 and capable of power generation, a motor MG2 arranged coaxially with the motor MG1 and connected to the power distribution and integration mechanism 40 through a reduction gear mechanism 50, capable of power generation, a transmission 60 that can transmit power from the power distribution and integration mechanism 40 to a drive shaft 67 with change in a speed ratio, a hybrid electronic control unit 70 for controlling the entire hybrid vehicle 20 (hereinafter referred to as "hybrid ECU") and the like.

The engine 22 is an internal combustion engine that receives supply of hydrocarbon fuel such as gasoline and light oil and outputs power and receives control of a fuel injection amount, ignition timing, intake air flow and the like from an engine electronic control unit (hereinafter referred to as "engine ECU") 24. To the engine ECU 24, signals from various sensors provided for the engine 22 and detecting a driving state of the engine 22 are inputted. The engine ECU 24 communicates with the hybrid ECU 70 and controls driving of the engine 22 on the basis of a control signal from the hybrid ECU 70 or the signals from the sensors and outputs data relating to the driving state of the engine 22 to the hybrid ECU 70 as necessary.

The motor MG1 and the motor MG2 are configured as known synchronous motor generators, both of which are capable of operating as a generator and a motor and exchange power with a battery 35, which is a secondary battery, through inverters 31, 32. A power line 39 connecting the inverters 31, 32 to the battery 35 is configured as a positive electrode bus line and a negative electrode bus line shared by the inverters 31, 32 so that power generated either one of the motors MG1, MG2 can be consumed by the other motor. Thus, the battery 35 is charged/discharged by power generated by or lacking in either one of the motors MG1, MG2, and it is not charged/ discharged if a power balance is achieved by the motors MG1, MG2. Both the motors MG1, MG2 are driven and controlled by a motor electronic control unit (hereinafter referred to as "motor ECU") 30. To the motor ECU 30, a signal required for drive and control of the motors MG1, MG2 such as a signal from rotational position detection sensors 33, 34 for detecting a rotational position of a rotor of the motors MG1, MG2 and a phase current and the like to be applied to the motors MG1, MG2 detected by a current sensor, not shown, are inputted, for example, while the motor ECU 30 outputs switching control signals and the like to the inverters 31, 32. The motor ECU 30 executes a rotation speed calculation routine, not shown, on the basis of a signal inputted from the rotational position detection sensors 33, 34 so as to calculate rotation speeds Nm1, Nm2 of the rotors of the motors MG1, MG2. The motor ECU 30 communicates with the hybrid ECU 70 and drives and controls the motors MG1, MG2 on the basis of a control signal or the like from the hybrid ECU 70 and outputs data relating to the driving states of the motors MG1, MG2 as necessary to the hybrid ECU 70.

The battery 35 is under control of a battery electronic control unit (hereafter referred to as battery ECU) 36. The battery ECU 36 receives diverse signals required for control of the battery 35, for example, an inter-terminal voltage measured by a voltage sensor (not shown) disposed between terminals of the battery 35, a charge-discharge current measured by a current sensor (not shown) attached to the power line 39 connected with the output terminal of the battery 35, and a battery temperature Tb measured by a temperature sensor 37 attached to the battery 35. The battery ECU 36 outputs data relating to the state of the battery 35 to the hybrid ECU 70 or engine ECU 24 via communication according to the requirements. The battery ECU 36 calculates a state of charge (SOC) of the battery 35, based on the accumulated charge-discharge current measured by the current sensor, for control of the battery 35.

The power distribution and integration mechanism 40 is accommodated in a transmission case, not shown, with the motors MG1, MG2, the reduction gear mechanism 50, and the transmission 60 and arranged coaxially with the crankshaft 26 with a predetermined distance from the engine 22. The power distribution and integration mechanism 40 in the embodiment is a double-pinion planetary gear mechanism having a sun gear 41 as an external gear, a ring gear 42 as an internal gear arranged concentrically with the sun gear 41, and a carrier 45 holding at least one set of two pinion gears 43, 44 meshed with each other, one of which is meshed with the sun gear 41 and the other with the ring gear 42, capable of rotation and revolution, and the mechanism 40 is configured so that the sun gear 41 (second element), the ring gear 42 (third element), and the carrier 45 (first element) are capable of differential rotation with each other. In the embodiment, to the sun gear 41 as the second element of the power distribution and integration mechanism 40, the motor MG1 as a second motor (hollow rotor) is connected through a hollow sun gear shaft 41*a* extending to the side opposite the engine 22 (rear in the vehicle) from the sun gear 41 and a hollow first motor shaft 46. Also, to the carrier 45 as the first element, the motor MG2 (hollow rotor) as a first motor is connected through the reduction gear mechanism 50 arranged between the power distribution and integration mechanism 40 and the engine 22 and a hollow second motor shaft 55 extending from the reduction gear mechanism 50 (sun gear 51) toward the engine 22. Moreover, to the ring gear 42 as the third element, the crankshaft 26 of the engine 22 is connected through a ring gear shaft 42*a* extending through the second motor shaft 55 and the motor MG2 and a damper 28.

Also, as shown in FIG. 1, between the sun gear shaft 41*a* and the first motor shaft 46, a clutch C0 (connecting/disconnecting unit) executing connection between the both (driving source element connection) and disconnection of the connection is provided. In the embodiment, the clutch C0 is configured, for example, as a dog clutch to mesh a dog fixed at the tip end of the sun gear shaft 41*a* with a dog fixed at the tip end of the first motor shaft 46 with a smaller loss and to disconnect the mesh between the both and it is driven by an electric, electromagnetic or hydraulic actuator 88. When the connection between the sun gear shaft 41*a* and the first motor shaft 46 is disconnected by the clutch C0, the connection between the motor MG1 as the second motor and the sun gear 41 as the second element of the power distribution and integration mechanism 40 is disconnected, and the engine 22 can be substantially separated from the motors MG1, MG2 and the transmission 60 by the function of the power distribution and integration mechanism 40.

The first motor shaft 46 which can be connected to the sun gear 41 of the power distribution and integration mechanism 40 through the clutch C0 as above is further extended to the side (rear in the vehicle) opposite the engine 22 from the motor MG1 and connected to the transmission 60. From the carrier 45 of the power distribution and integration mechanism 40, a carrier shaft (connecting shaft) 45*a* is extended to the side (rear in the vehicle) opposite the engine 22 through the hollow sun gear shaft 41*a* and the first motor shaft 46, and the carrier shaft 45*a* is also connected to the transmission 60. By this arrangement, in the embodiment, the power distribution and integration mechanism 40 is coaxially arranged with both the motors MG1, MG2 between the motor MG1 and the motor MG2 arranged coaxially with each other, and the engine 22 is arranged coaxially side by side with the motor MG2 and is opposed to the transmission 60 with the power distribution and integration mechanism 40 between them. That is, in the embodiment, the components of the power output apparatus of the engine 22, the motors MG1, MG2, the power distribution and integration mechanism 40 and the transmission 60 are arranged from the front in the vehicle in the order to the engine 22, the motor MG2, (reduction gear mechanism 50), the power distribution and integration mechanism 40, the motor MG1, and the transmission 60. By this arrangement, the power output apparatus can be made compact, excellent in mountability and suitable for the hybrid vehicle 20 running mainly by driving rear wheels.

Also, in the embodiment, the sun gear 41 as the second element of the power distribution and integration mechanism 40 is connected to the transmission 60 through the sun gear shaft 41*a*, the clutch C0, and the first motor shaft 46, and the carrier 45 as the first element of the power distribution and integration mechanism 40 is connected to the transmission 60 through the carrier shaft 45*a*. By this arrangement, in the hybrid vehicle 20, either one of the sun gear 41 and the carrier 45 of the power distribution and integration mechanism 40 can be made as a reaction element in charge of a reaction force against a torque outputted from the engine 22, while the other is made as an output element to output power to the transmission 60. By functioning the sun gear 41 as the reaction element, the motor MG1 functions as the generator, and the power distribution and integration mechanism 40 distributes the power from the engine 22 inputted through the ring gear 42 to the sun gear 41 side and the carrier 45 side according to the speed ratio, integrates the power from the engine 22 and the power from the motor MG2 functioning as the motor and outputs it to the carrier 45 side at this time. By functioning the carrier 45 as the reaction element, the motor MG2 functions as the generator and the power distribution and integration mechanism 40 distributes the power from the engine 22 inputted through the ring gear 42 to the sun gear 41 side and the carrier 45 side according to the speed ratio, integrates the power from the engine 22 and the power from the motor MG1 functioning as the motor and outputs it to the sun gear 41 side at this time.

The reduction gear mechanism 50 is a single-pinion planetary gear mechanism provided with a sun gear 51 as an external gear, a ring gear 52 as an internal gear arranged concentrically with the sun gear 51, a plurality of pinion gears 53 meshed both with the sun gear 51 and the ring gear 52, and a carrier 54 holding the plurality of pinion gears 53 capable of revolution and rotation. The sun gear 51 of the reduction gear mechanism 50 is connected to the rotor of the motor MG2 through the above second motor shaft 55. The ring gear 52 of the reduction gear mechanism 50 is fixed to the carrier 45 of the power distribution and integration mechanism 40, and thus the reduction gear mechanism 50 is substantially integrated with the power distribution and integration mechanism 40. The carrier 54 of the reduction gear mechanism 50 is fixed to the transmission case. Therefore, by the action of the reduction gear mechanism 50, power from the motor MG2 is decelerated and inputted to the carrier 45 of the power distribution and integration mechanism 40, while the power from the carrier 45 is accelerated and inputted to the motor MG2. As in the embodiment, by arranging the reduction gear mechanism 50 between the motor MG2 and the power distribution and integration mechanism 40 so as to integrate it with the power distribution and integration mechanism 40, the power output apparatus can be made further compact.

The transmission 60 is configured as a parallel-shaft automatic transmission capable of setting a speed ratio in a plurality of stages and includes a first counter drive gear 61a and a first counter driven gear 61b constituting a first gear train, a second counter drive gear 62a and a second counter driven gear 62b constituting a second gear train, a third counter drive gear 63a and a third counter driven gear 63b constituting a third gear train, a fourth counter drive gear 64a and a fourth counter driven gear 64b constituting a fourth gear train, a counter shaft 65 to which each of the counter driven gears 61b to 64b and a gear 66b are fixed, clutches C1, C2, a gear 66a mounted on the drive shaft 67, a reverse gear train, not shown, and the like (hereinafter the "counter drive gear" and the "counter driven gear" are simply referred to as a "gear" as appropriate). In the transmission 60, the speed ratio (gear ratio) of the first gear train is the largest, and the speed ratio (gear ratio) is reduced as going through the second gear train, the third gear train and the fourth gear train.

As shown in FIG. 1, the first gear 61a in the first gear train is held by the carrier shaft 45a extended from the carrier 45 as the first element of the power distribution and integration mechanism 40 rotatably and immovably in the axial direction and meshed with the first gear 61b fixed to the counter shaft 65 all the time. Similarly, the third gear 63a of the third gear train is held by the carrier shaft 45a rotatably and immovably in the axial direction and is meshed with the third gear 63b fixed to the counter shaft 65 all the time. In the embodiment, on the carrier shaft 45a side (counter drive gear side), the clutch C1 is arranged that can selectively fix either one of the first gear 61a (first gear train) and the third gear 63a (third gear train) to the carrier shaft 45a and rotatably release both the first gear 61a and the third gear 63a with respect to the carrier shaft 45a. In the embodiment, the clutch C1 is constructed as a dog clutch that can mesh a dog held by the carrier shaft 45a unrotatably and movably in the axial direction with either one of the dog fixed to the first gear 61a and the dog fixed to the third gear 63a with a smaller loss and release the mesh between the both, for example, and the clutch C1 is driven by the actuator 88. The gears 61a, 61b of the first gear train, the gears 63a, 63b of the third gear train, and the clutch C1 constitute a first transmission mechanism of the transmission 60. The second gear 62a of the second gear train is held rotatably and immovably in the axial direction by the first motor shaft 46 which can be connected through the clutch C0 to the sun gear 41 as the second element of the power distribution and integration mechanism 40 and is meshed with the second gear 62b fixed to the counter shaft 65 all the time. Similarly, the fourth gear 64a of the fourth gear train is also held rotatably and immovably in the axial direction by the first motor shaft 46 and meshed with the fourth gear 64b fixed to the counter shaft 65 all the time. In the embodiment, on the first motor shaft 46 side (counter drive gear side), the clutch C2 is arranged that can selectively fix either of the second gear 62a (second gear train) and the fourth gear 64a (fourth gear train) to the first motor shaft 46 and rotatably release both the second gear 62a and the fourth gear 64a with respect to the first motor shaft 46. In the embodiment, the clutch C2 is also constructed as a dog clutch that can mesh the dog held unrotatably and movably in the axial direction by the first motor shaft 46 with either of the dog fixed to the second gear 62a and the dog fixed to the fourth gear 64a with a smaller loss and release the mesh between the both and the clutch C2 is driven by the actuator 88. The gears 62a, 62b of the second gear train, the gears 64a, 64b of the fourth gear train, and the clutch C2 constitute a second transmission mechanism of the transmission 60. In the embodiment, the actuator 88 is shown as a single body, but it is needless to say that the actuator can drive the clutches C0, C1 and C2 individually.

The power transmitted from the carrier shaft 45a or the first motor shaft 46 to the counter shaft 65 is transmitted to the drive shaft 67 through the gears 66a, 66b and outputs to rear wheels 69a, 69b as drive wheels in the end through a differential gear 68. By providing the clutches C1, C2 on the side of the carrier shaft 45a, the first motor shaft 46 as in the transmission 60 of the embodiment, loss when the gears 61a to 64a are fixed to the carrier shaft 45a or the first motor shaft 46 can be reduced by the clutches C1, C2. That is, though depending on the ratio of the numbers of teeth in the respective gear trains, particularly for the second transmission mechanism including the fourth gear train with a smaller reduction ratio, the rotation speed of the gear 64a idling before being fixed to the first motor shaft 46 by the clutch C2 is lower than the rotation speed of the gear 64b on the corresponding counter shaft 65 side, respectively, and by providing at least the clutch C2 on the first motor shaft 46 side, the dog of the gear 64a and the dog of the first motor shaft 46 can be engaged with each other with a smaller loss. For the first transmission mechanism including the first gear train with a large reduction ratio, the clutch C1 may be provided on the counter shaft 65 side. According to the transmission 60 configured as above, by disengaging the clutch C2 and by fixing either one of the first gear 61a (first gear train) and the third gear 63a (third gear train) to the carrier shaft 45a by the clutch C1, the power from the carrier shaft 45a can be transmitted to the drive shaft 67 through the first gear 61a (first gear train) or the third gear 63a (third gear train) and the counter shaft 65. By engaging the clutch C0 and disengaging the clutch C1 and by fixing either one of the second gear 62a (second gear train) and the fourth gear 64a (fourth gear train) by the clutch C2 to the first motor shaft 46, the power from the first motor shaft 46 can be transmitted to the drive shaft 67 through the second gear 62a (second gear train) or the fourth gear 64a (fourth gear train) and the counter shaft 65. Hereinafter, the state to transmit the power using the first gear train is referred to as the "first change speed state (first speed)", the state to transmit the power using the second gear train as the "second change speed state (second speed)", the state to transmit the power using the third gear train as the "third change speed state (third speed)", and the state to transmit the power using the fourth gear train as the "fourth change speed state (fourth speed)". In the transmission 60 of the embodiment, since the clutches C1, C2 are provided on the side of the carrier shaft 45a, the first motor shaft 46, loss can be reduced when the gears 61a to 64a are fixed to the carrier shaft 45a or the first motor shaft 46 by the clutches C1, C2. That is, though depending on the ratio of the numbers of teeth in the respective gear trains, particularly for the second transmission mechanism including the fourth gear train with a smaller reduction ratio, the rotation speed of the gear 64a idling before being fixed to the first motor shaft 46 by the clutch C2 is lower than the corresponding rotation speed of the gear 64b on the counter shaft 65 side, and by providing at least the clutch C2 on the first motor shaft 46 side, the dog of the gear 64a and the dog of the first motor shaft 46 can be engaged with each other with a smaller loss. For the first transmission mechanism including the first gear train with a large reduction ratio, the clutch C1 may be provided on the counter shaft 65 side.

The hybrid ECU 70 is constructed as a microprocessor including a CPU 72, a ROM 74 that stores processing programs, a RAM 76 that temporarily stores data, and a non-illustrated input-output port, and a non-illustrated communication port. The hybrid ECU 70 receives various inputs via the input port: an ignition signal from an ignition switch 80 (start switch), a gearshift position SP from a gearshift position sensor 82 that detects the gearshift position SP indicating a current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 87. The hybrid ECU 70 communicates with the engine ECU 24, the motor ECU 30, and the battery ECU 36 via the communication port to transmit diverse control signals and data to and from the engine ECU 24, the motor ECU 30, and the battery ECU 36, as mentioned previously. The hybrid ECU 70 also controls actuator 88 actuating clutch C0, clutch C1 and C2 of transmission 60.

Figure 2:
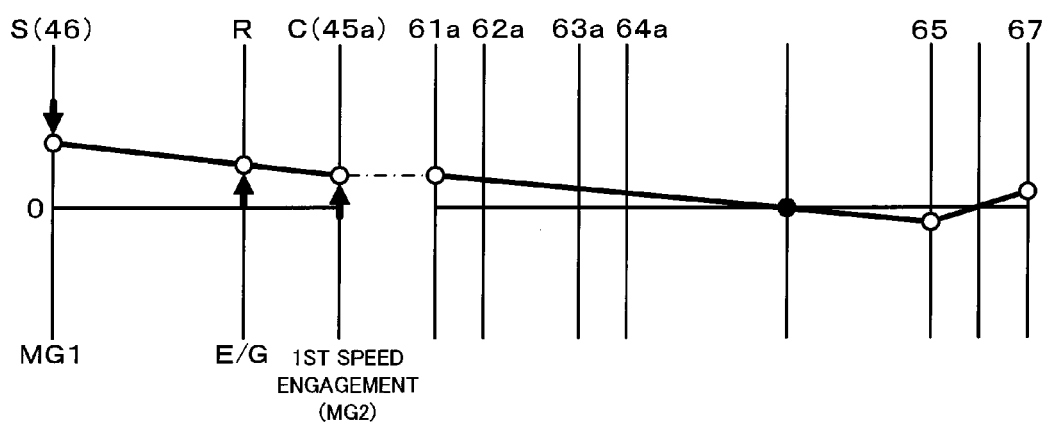
FIG. 2 is an explanatory diagram exemplifying a relation of a rotation speed and a torque of main elements of a power distribution and integration mechanism 40 and a transmission 60 when a speed ratio of the transmission 60 is changed according to change in the vehicle speed when driving the hybrid vehicles 20 of the embodiment with operation of an engine 22.
Figure 3:
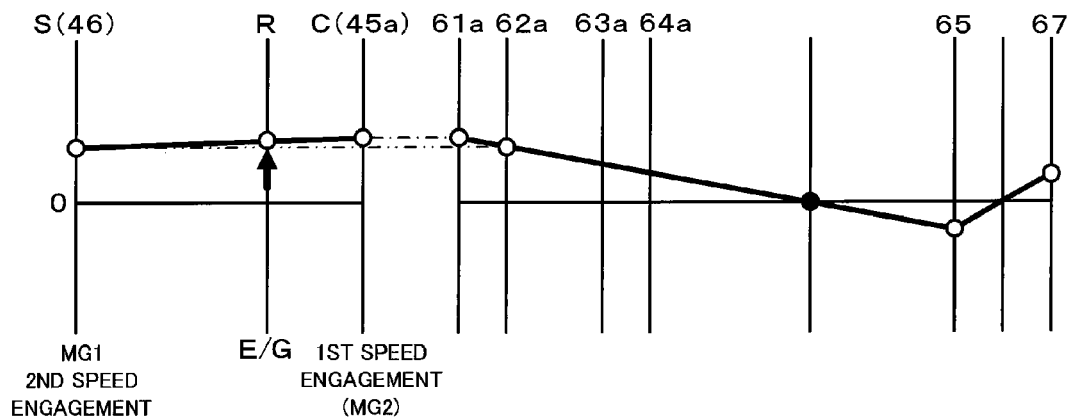
FIG. 3 is an explanatory diagram similar to FIG. 2.

Next, outline of an operation of the hybrid vehicle 20 will be described referring to FIGS. 2 to 8. In the hybrid vehicle 20, during running with engagement of the clutch C0 and operation of the engine 22, by disengaging the clutch C2 and fixing the first gear 61a (first gear train) to the carrier shaft 45a by the clutch C1, as shown in FIG. 2, the power from the carrier shaft 45a can be speed-changed (reduced) on the basis of the speed ratio of the first gear train (first gears 61a, 61b) and outputted to the drive shaft 67. Also, according to a change in the vehicle speed V, as shown in FIG. 3, in the first change speed state where the first gear 61a (first gear train) is fixed to the carrier shaft 45a by the clutch C1, by fixing the second gear 62a (second gear train) to the first motor shaft 46 by the clutch C2 and setting a torque command to the motors MG1 and MG2 to a value 0, the power (torque) from the engine 22 can be mechanically (directly) transmitted to the drive shaft 67 at a fixed (constant) speed ratio (a value between the speed ratio of the first gear train and the speed ratio of the second gear train) without conversion to electric energy. Hereinafter, such a state to connect the carrier 45 as the first element of the power distribution and integration mechanism 40 and the sun gear 41 as the second element to the drive shaft 67 by the first gear train and by the second gear train of the transmission 60, respectively (FIG. 3) is referred to as a "1-2 speed simultaneous engagement state".

Figure 4:
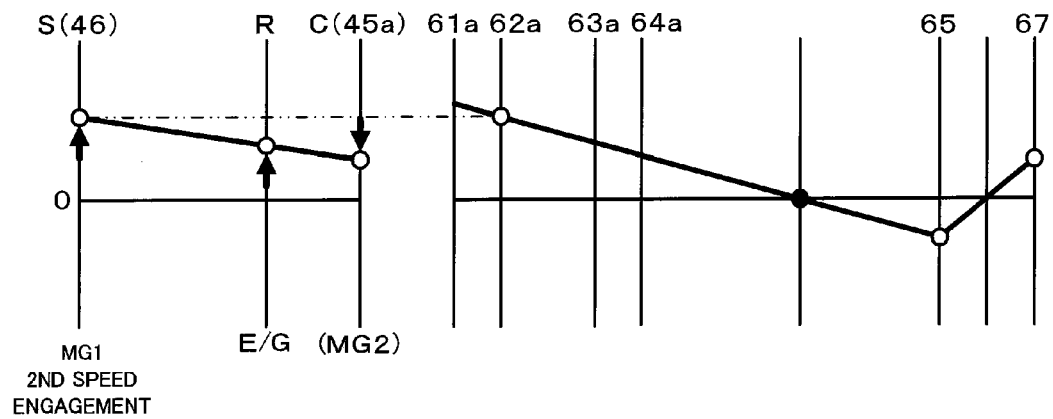
FIG. 4 is an explanatory diagram similar to FIG. 2.
Figure 5:
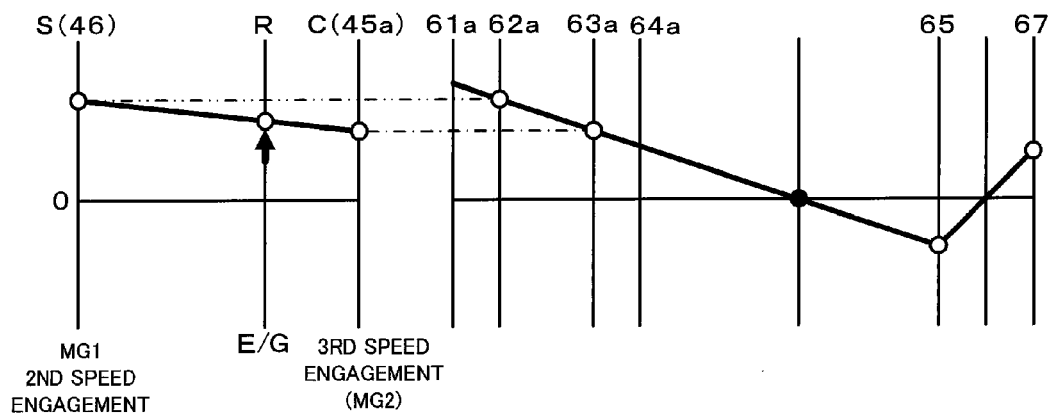
FIG. 5 is an explanatory diagram similar to FIG. 2.

Moreover, if the clutch C1 is disengaged in the 1-2 speed simultaneous engagement state shown in FIG. 3, as shown by a two-dot chain line in FIG. 4, only the second gear 62a (second gear train) is fixed to the first motor shaft 46 (sun gear 41) by the clutch C2, and the power from the first motor shaft 46 can be speed-changed on the basis of the speed ratio of the second gear train (second gears 62a, 62b) and outputted to the drive shaft 67. Also, according to the change in the vehicle speed V, as shown in FIG. 5, in the second change speed state where the second gear 62a (second gear train) is fixed to the first motor shaft 46 by the clutch C2, by fixing the third gear 63a (third gear train) to the carrier shaft 45a by the clutch C1 and setting the torque command to the motors MG1 and MG2 to a value 0, the power (torque) from the engine 22 can be mechanically (directly) transmitted to the drive shaft 67 at a fixed (constant) speed ratio (a value between the speed ratio of the second gear train and the speed ratio of the third gear train) different from the 1-2 speed simultaneous engagement state without conversion to the electric energy. Hereinafter, such a state to connect the sun gear 41 as the second element of the power distribution and integration mechanism 40 and the carrier 45 as the first element to the drive shaft 67 by the second gear train of the transmission 60 and by the third gear train of the transmission 60, respectively (FIG. 5) is referred to as a "2-3 speed simultaneous engagement state".

Figure 6:
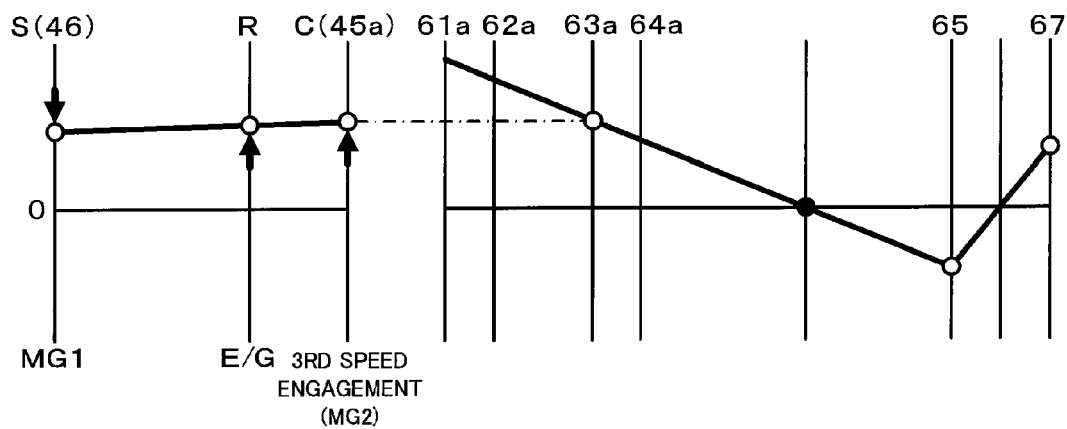
FIG. 6 is an explanatory diagram similar to FIG. 2.
Figure 7:
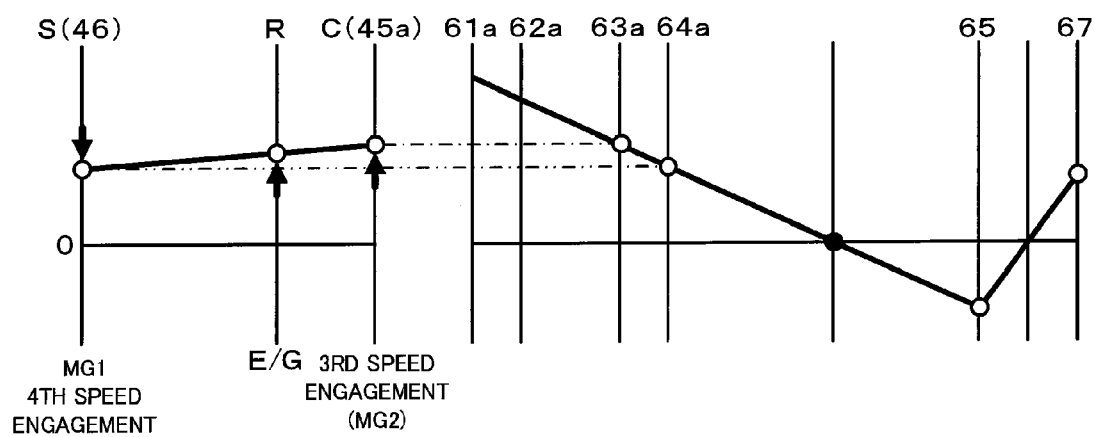
FIG. 7 is an explanatory diagram similar to FIG. 2.
Figure 8:
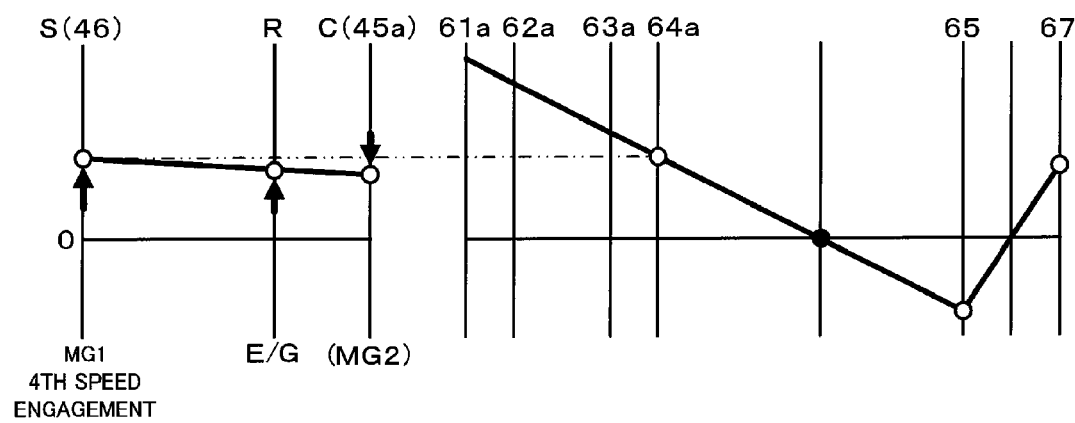
FIG. 8 is an explanatory diagram similar to FIG. 2.

By disengaging the clutch C2 in the 2-3 speed simultaneous engagement state shown in FIG. 5, as shown by a one-dot chain line in FIG. 6, only the third gear 63a (third gear train) is fixed to the carrier shaft 45a (carrier 45) by the clutch C1, and the power from the carrier shaft 45a can be speed-changed on the basis of the speed ratio of the third gear train (third gears 63a, 63b) and outputted to the drive shaft 67. Moreover, according to the change in the vehicle speed V, in the third change speed state in which the third gear 63a (third gear train) is fixed to the carrier shaft 45a by the clutch C1 as shown in FIG. 7, by fixing the fourth gear 64a (fourth gear train) to the first motor shaft 46 by the clutch C2 and setting the torque command to the motors MG1 and MG2 to a value 0, the power (torque) from the engine 22 can be mechanically (directly) transmitted to the drive shaft 67 at a fixed (constant) speed ratio (a value between the speed ratio of the third gear train and the speed ratio of the fourth gear train) different from the 1-2 speed simultaneous engagement state or the 2-3 speed simultaneous engagement state without conversion to the electric energy. Hereinafter, such a state to connect the carrier 45 as the first element of the power distribution and integration mechanism 40 and the sun gear 41 as the second element to the drive shaft 67 by the third gear train of the transmission 60 and by the fourth gear train of the transmission 60, respectively (FIG. 7) is referred to as a "3-4 simultaneous engagement state." After that, by disengaging the clutch C1 in the 3-4 speed simultaneous engagement state shown in FIG. 7, as shown by a two-dot chain line in FIG. 8, only the fourth gear 64a (fourth gear train) is fixed to the first motor shaft 46 (sun gear 41) by the clutch C2, and the power from the first motor shaft 46 can be speed-changed on the basis of the speed ratio of the fourth gear train (fourth gears 64a, 64b) and outputted to the drive shaft 67. In FIGS. 2 to 8, an S axis represents the rotation speed of the sun gear 41 of the power distribution and integration mechanism 40 (a rotation speed Nm1 of the motor MG1, that is the first motor shaft 46), an R axis for the rotation speed of the ring gear 42 of the power distribution and integration mechanism 40 (rotation speed Ne of the engine 22), and a C axis for the rotation speed of the carrier 45 of the power distribution and integration mechanism 40 (carrier shaft 45a and the ring gear 52 of the reduction gear mechanism 50), respectively. A 61a axis to a 64a axis, a 65 axis and a 67 axis represent rotation speeds of the first gear 61a to the fourth gear 64a, the counter shaft 65 and the drive shaft 67 of the transmission 60, respectively.

Figure 9:
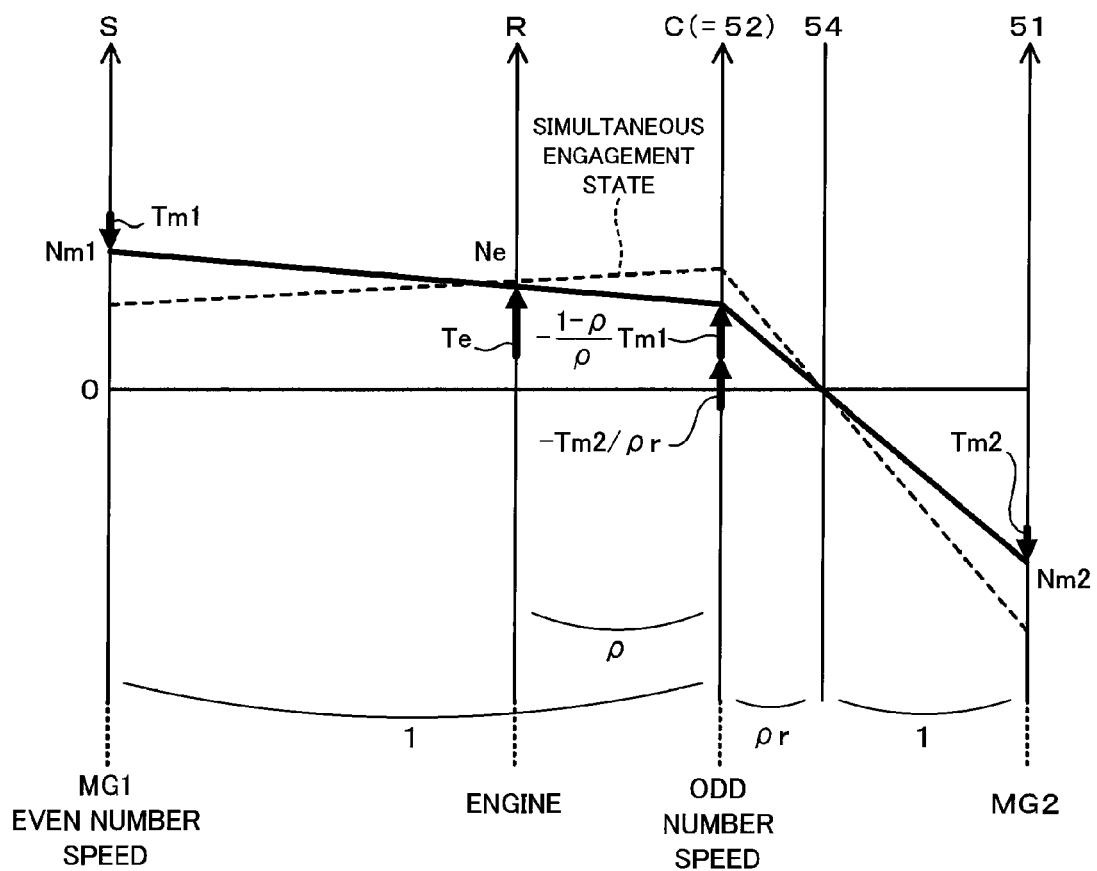
FIG. 9 is an explanatory diagram illustrating an example of an alignment chart showing a relation between rotation speed and torque in each element in a power distribution and integration mechanism 40 and each element in a reduction gear mechanism 50 when a motor MG1 functions as a generator and a motor MG2 functions as a motor.
Figure 10:
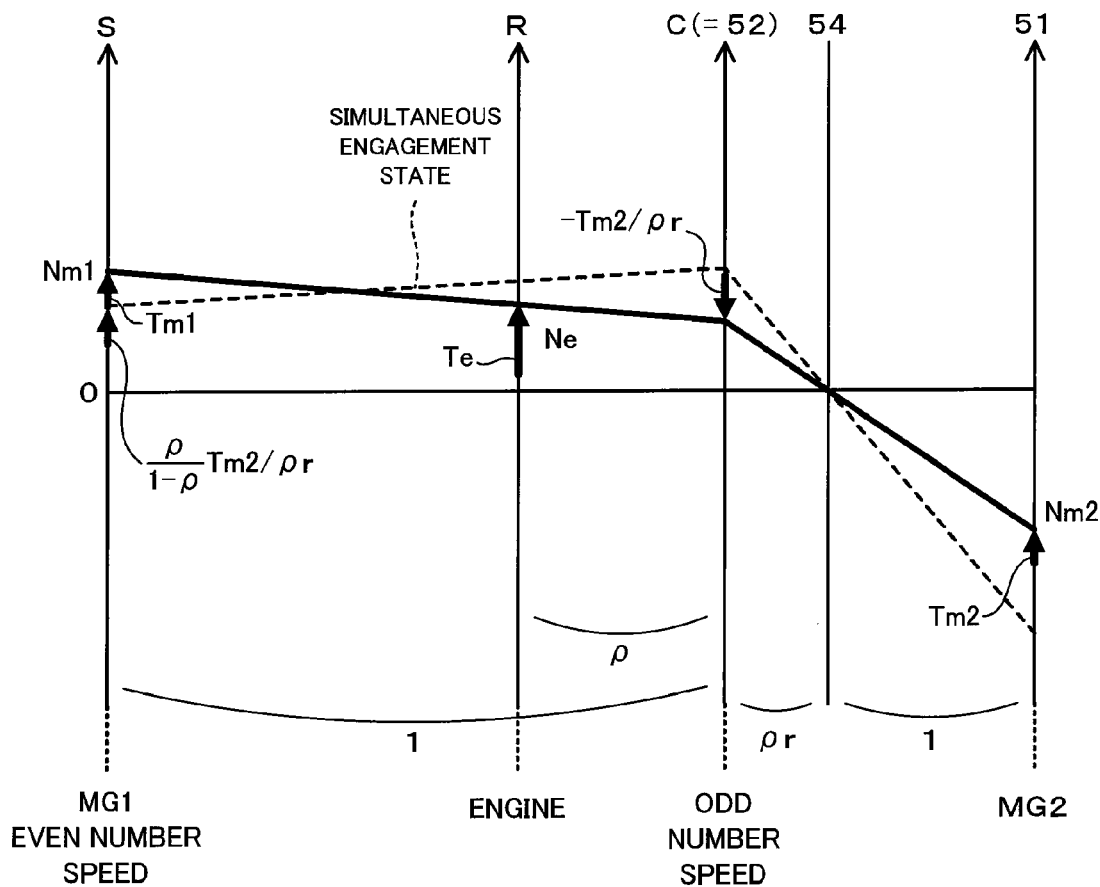
FIG. 10 is an explanatory diagram illustrating an example of an alignment chart showing a relation between rotation speed and torque in each element in the power distribution and integration mechanism 40 and each element in the reduction gear mechanism 50 when a motor MG2 functions as a generator and a motor MG1 functions as a motor.

When the hybrid vehicle 20 is driven with operation of the engine 22 as above, if the transmission 60 is set to the first or the third change speed state, the motors MG1, MG2 can be driven and controlled so that the carrier 45 of the power distribution and integration mechanism 40 becomes an output element and the motor MG2 connected to the carrier 45 functions as a motor, while the motor MG1 connected to the sun gear 41 to be a reaction element functions as a power generator. Hereinafter, a mode in which the motor MG1 functions as a power generator and the motor MG2 functions as a motor is referred to as a "first torque conversion mode". An example of an alignment chart illustrating a relation between a rotation speed and a torque in each element of the power distribution and integration mechanism 40 and each element of the reduction gear mechanism 50 in such a first torque conversion mode is shown in FIG. 9. In FIG. 9, the S axis, R axis, and C axis show those similar to FIGS. 2 to 8, and a 54 axis denotes a rotation speed of the carrier 54 of the reduction gear mechanism 50, and a 51 axis for the rotation speed of the sun gear 51 of the reduction gear mechanism 50 (the rotation speed Nm2 of the motor MG2, that is, the second motor shaft 55), respectively, and ρ denotes a gear ratio of the power distribution and integration mechanism 40 (the number of teeth of the sun gear 41/the number of teeth of the ring gear 42), and ρr for a gear ratio (reduction ratio) of the reduction gear mechanism 50 (the number of teeth of the sun gear 51/the number of teeth of the ring gear 52), respectively. In FIG. 9, a bold arrow represents torque acting on each element, and if the arrow is oriented upward in the figure, a value of the torque is positive, while if the arrow is oriented downward in the figure, a value of the torque is negative (the same applies to FIGS. 2 to 8 and FIGS. 10 and 11). In such first torque conversion mode, the power from the engine 22 is torque-converted by the power distribution and integration mechanism 40 and the motors MG1 and MG2 and outputted to the carrier 45, and the rotation speed of the motor MG1 is controlled, and thus a ratio between the rotation speed Ne of the engine 22 and the rotation speed of the carrier 45 as the output element can be varied in a non-step and continuous manner. When the hybrid vehicle 20 is driven with operation of the engine 22, if the transmission 60 is set to the second or fourth change speed state, the motors MG1, MG2 can be driven and controlled so that the motor MG1 connected to the sun gear 41 of the power distribution and integration mechanism 40 with the sun gear 41 as the output element functions as a motor, while the motor MG2 connected to the carrier 45 to be the reaction element functions as a power generator. Hereinafter, a mode in which the motor MG2 functions as a power generator and the motor MG1 functions as a motor is referred to as a "second torque conversion mode". An example of an alignment chart illustrating a relation of the rotation speed and the torque in each element of the power distribution and integration mechanism 40 and each element in the reduction gear mechanism 50 in such second torque conversion mode is shown in FIG. 10. In such second torque conversion mode, the power from the engine 22 is torque-converted by the power distribution and integration mechanism 40 and the motors MG1 and MG2 and outputted to the sun gear 41, and a ratio between the rotation speed Ne of the engine 22 and the rotation speed of the sun gear 41 as the output element can be varied in a non-step and continuous manner by controlling the rotation speed of the motor MG2. Reference numerals in FIG. 10 are the same as those in FIG. 9.

As mentioned above, in the hybrid vehicle 20 in the embodiment, since the first torque conversion mode and the second torque conversion mode can be switched to each other with change in the speed ratio (change speed state) of the transmission 60, when the rotation speed Nm2 or Nm1 of the motor MG2 or MG1 particularly functioning as a motor is increased, a value of the rotation speed Nm1 or Nm2 of the motor MG1 or MG2 functioning as a power generator can be prevented from being negative. Therefore, in the hybrid vehicle 20, it is possible to prevent occurrence of a power circulation that is a phenomenon in which the motor MG2 uses a part of the power outputted to the carrier shaft 45a to generate electric power and the electric power generated by the motor MG2 is consumed by the motor MG1 to output power while the rotation speed of the motor MG1 being negative in the first torque conversion mode, and that is a phenomenon in which the motor MG1 uses a part of the power outputted to the first motor shaft 46 to generate electric power and the electric power generated by the motor MG1 is consumed by the motor MG2 to output power while the rotation speed of the motor MG2 being negative in the second torque conversion mode. Thus, transmission efficiency of power in a wider driving region can be improved in the hybrid vehicle 20. Also, since the maximum rotation speeds of the motors MG1, MG2 can be restricted by prevention of the power circulation, the size of the motors MG1, MG2 can be reduced. Moreover, in the hybrid vehicle 20, since the power from the engine 22 can be mechanically (directly) transmitted to the drive shaft 67 at a speed ratio specific to the above 1-2 speed simultaneous engagement state, 2-3 speed simultaneous engagement state and 3-4 speed simultaneous engagement state, respectively, a chance to mechanically output power from the engine 22 to the drive shaft 67 can be increased without conversion to electric energy, and the power transmission efficiency in the wider driving region can be further improved. In a power output apparatus using an engine, two motors, and a differential rotation mechanism such as a planetary gear mechanism in general, when a reduction ratio between the engine and the drive shaft is relatively large, more of the power from the engine is converted to electric energy, which tends to deteriorate the power transmission efficiency and to incur heat generation in the motors MG1, MG2. Thus, in the above simultaneous engagement mode is advantageous particularly when the speed ratio between the engine 22 and the drive shaft is relatively large. Also, in the hybrid vehicle 20 in the embodiment, when the speed ratio of the transmission 60 is to be changed, the simultaneous engagement mode is executed once between the first torque conversion mode and the second torque conversion mode. And thus, so-called torque loss does not occur at a change of the speed ratio, and the change of the speed ratio, that is, switching between the first torque conversion mode and the second torque conversion mode can be carried out extremely smoothly and without a shock.

Figure 11:
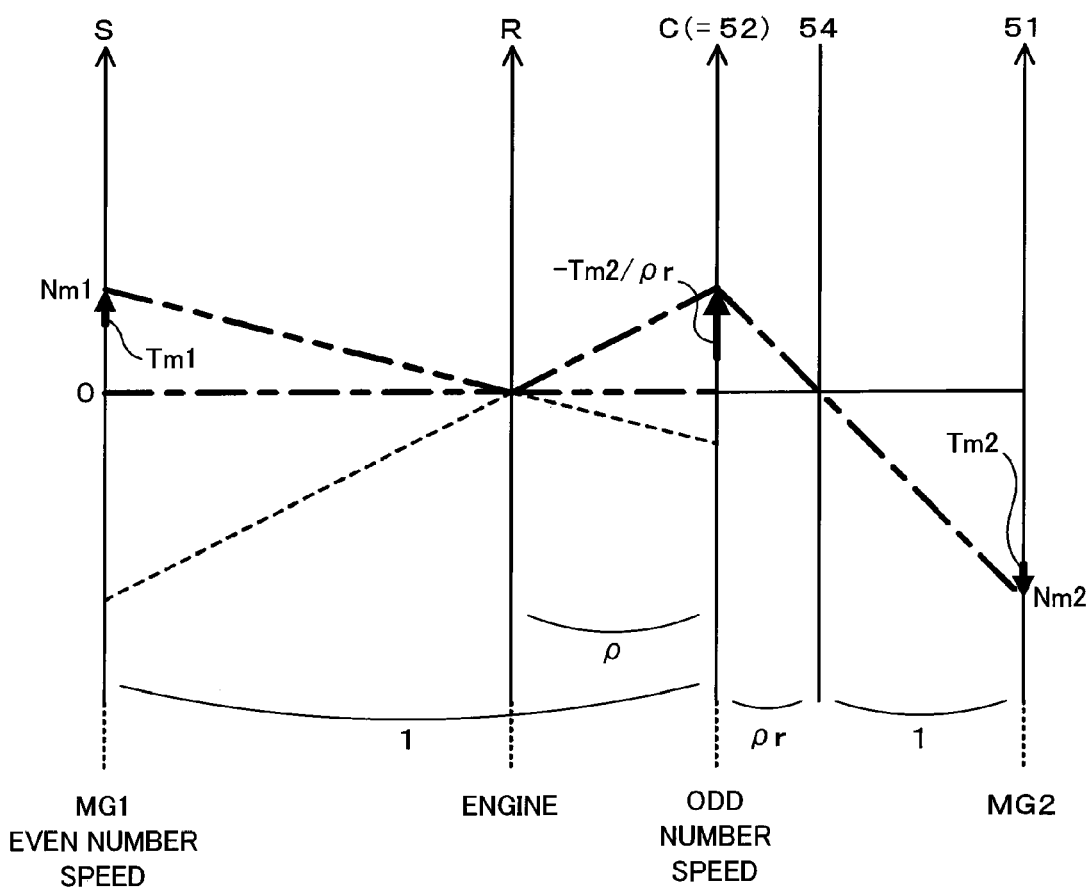
FIG. 11 is an explanatory diagram for explaining a motor running mode in a hybrid vehicle 20 in the embodiment.

Next, referring to FIG. 11 and the like, outline of a motor driving mode in which power is outputted to the motor MG1 and the motor MG2 using power from the battery 35 in a state where the engine 22 is stopped and the hybrid vehicle 20 is driven by that will be described. In the hybrid vehicle 20 in the embodiment, the motor running mode is roughly classified into a clutch-engaged 1-motor running mode in which power is outputted to either one of the motors MG1 and MG2, while the clutch C0 is kept connected, a clutch-disengaged 1-motor running mode in which power is outputted to either one of the motors MG1 and MG2 while the clutch C0 is disengaged, and a 2-motor running mode in which the power from both the motors MG1 and MG2 can be used with the clutch C0 disengaged.

When the clutch-engaged 1-motor running mode is to be executed, while the clutch C0 is engaged, the clutch C2 of the transmission 60 is disengaged and the first gear 61a of the first gear train or the third gear 63a of the third gear train is fixed to the carrier shaft 45a by the clutch C1 so that power is outputted only by the motor MG2, or the clutch C1 of the transmission 60 is disengaged and the second gear 62a of the second gear train or the fourth gear 64a of the fourth gear train is fixed to the first motor shaft 46 by the clutch C2 so that power is outputted only by the motor MG1. In such clutch-engaged 1-motor running mode, since the sun gear 41 of the power distribution and integration mechanism 40 and the first motor shaft 46 are connected by the clutch C0, the motor MG1 or MG2 not outputting power corotates with the motor MG2 or MG1 outputting power and runs idle (See a broken line in FIG. 11). When the clutch-disengaged 1-motor running mode is to be executed, the clutch C0 is disengaged, and then, the clutch C2 of the transmission 60 is disengaged and the first gear 61a of the first gear train or the third gear 63a of the third gear train is fixed to the carrier shaft 45a by the clutch C1 so that power is outputted only by the motor MG2, or the clutch C1 of the transmission 60 is disengaged and the second gear 62a of the second gear train or the fourth gear 64a of the fourth gear train is fixed to the first motor shaft 46 by the clutch C2 so that power is outputted only by the motor MG1. In such clutch-disengaged 1-motor running mode, as shown by a one-dot chain line and a two-dot chain line in FIG. 11, since the clutch C0 is disengaged and connection between the sun gear 41 and the first motor shaft 46 is disconnected, the corotation of the crank shaft 26 of the non-operated engine 22 is avoided by the function of the power distribution and integration mechanism 40 and the corotation of the non-operated motor MG1 or MG2 is avoided by the disengagement of the clutch C2 or C1, thereby preventing a drop in the power transmission efficiency. Moreover, when the 2-motor running mode is to be executed, the clutch C0 is disengaged and the transmission 60 is set to the above 1-2 speed simultaneous engagement state, 2-3 speed simultaneous engagement state or 3-4 speed simultaneous engagement state by using clutches C1 and C2, and then, at least either one of the motors MG1 and MG2 is driven and controlled. By this operation, while corotation of the engine 22 is avoided, power is outputted both from the motors MG1 and MG2, and a large power can be transmitted to the drive shaft 67 in the motor running mode. Thus, so-called hill start can be favorably executed and towing performance or the like during motor running can be favorably ensured.

In the hybrid vehicle 20 in the embodiment, when the clutch-disengaged 1-motor running mode is selected, the speed ratio (change speed state) of the transmission 60 can be easily changed so that the power can be efficiently transmitted to the drive shaft 67. For example, in the clutch-disengaged 1-motor running mode, the first gear 61a of the first gear train or the third gear 63a of the third gear train is fixed to the carrier shaft 45a by the clutch C1 of the transmission 60, and when power is outputted only by the motor MG2, the rotation speed of the motor MG1 which has been stopped is synchronized with the rotation speed of the second gear 62a of the second gear train or the fourth gear 64a of the fourth gear train and the second gear 62a or the fourth gear 64a is fixed to the first motor shaft 46 by the clutch C2. Then, the mode can be transferred to any of the above 1-2 speed simultaneous engagement state, 2-3 speed simultaneous engagement state and 3-4 speed simultaneous engagement state, that is, to a 2-motor running mode. If the clutch C1 of the transmission 60 is disengaged in this state and power is outputted only by the motor MG1, the power outputted by the motor MG1 can be transmitted to the drive shaft 67 through the second gear train or the fourth gear train of the transmission 60. As a result, in the hybrid vehicle 20 in this embodiment, even in the motor running mode, the rotation speed of the carrier shaft 45a and the first motor shaft 46 can be speed-changed using the transmission 60 so as to amplify the torque or the like, and thus the maximum torque required for the motors MG1, MG2 can be lowered and the size of the motors MG1, MG2 can be reduced. Also, at change of the speed ratio of the transmission 60 in such motor running, the simultaneous engagement state of the transmission 60, that is, 2-motor running mode is executed once, and thus, so-called torque loss does not occur at the change of the speed ratio, but the change of the speed ratio can be executed extremely smoothly and without a shock. In these motor running modes, if required driving force is increased or a state of charge SOC of the battery 35 is lowered, cranking of the engine 22 by the motor MG1 or MG2, which results in no output of power according to the speed ratio of the transmission 60, is executed so as to start the engine 22.

Figure 12:
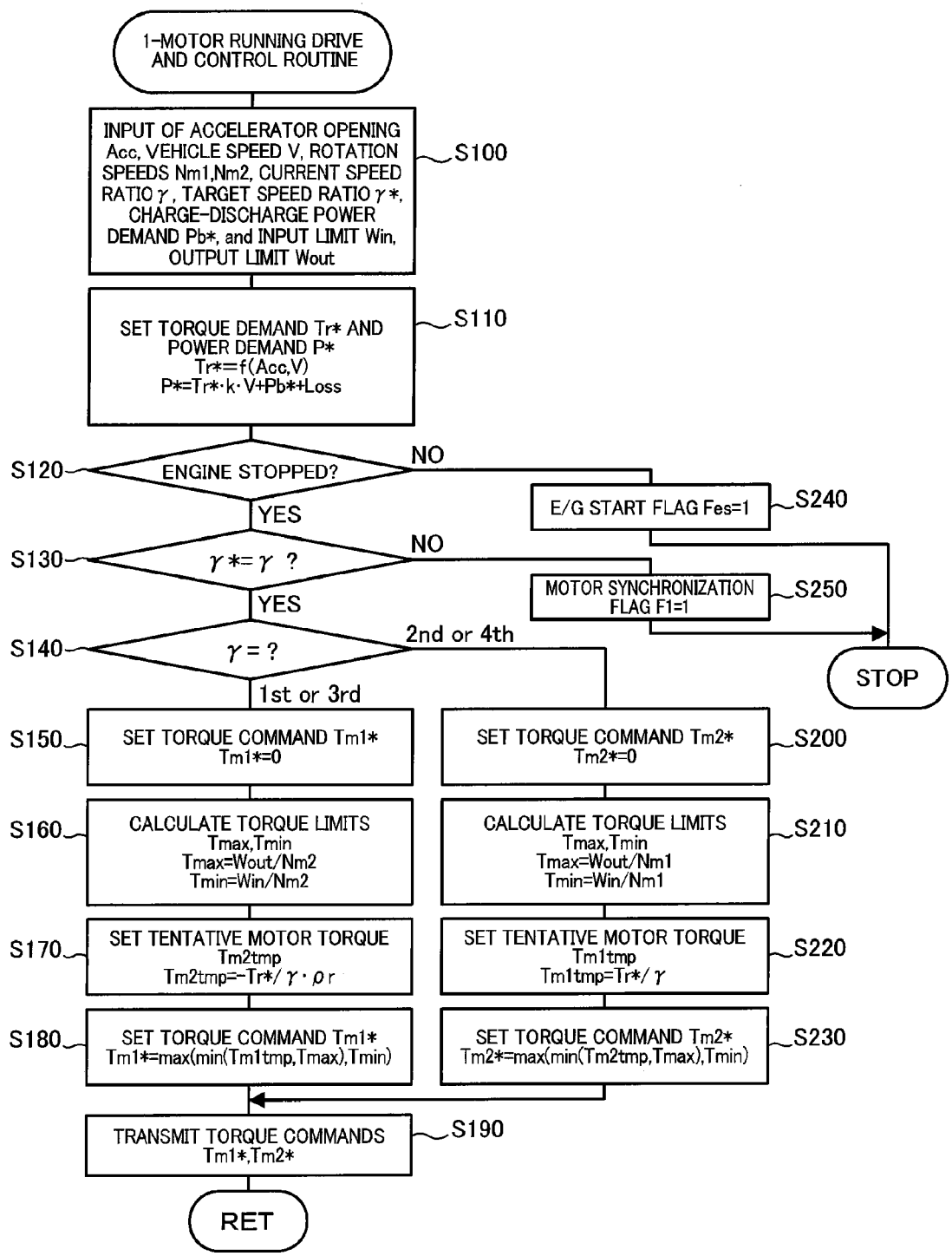
FIG. 12 is a flowchart illustrating an example of a drive and control routine at 1-motor running executed by a hybrid ECU 70 when a clutch engagement 1-motor running mode is selected in the hybrid vehicle 20 in the embodiment.

Referring to FIGS. 12 to 18, a control procedure when the hybrid vehicle 20 is run in the clutch-engaged 1-motor running mode in which the clutch C0 is kept engaged and power is outputted by either one of the motor MG1 and MG2 will be described specifically. FIG. 12 is a flowchart illustrating an example of a 1-motor running drive and control routine executed by the hybrid ECU 70 when the clutch-engaged 1-motor running mode is selected. This routine is executed every predetermined time (every several msec, for example).

At start of the 1-motor running drive and control routine in FIG. 12, the CPU 72 of the hybrid ECU 70 executes input processing of data required for control such as an accelerator opening Acc from an accelerator pedal position sensor 84, the vehicle speed V from a vehicle speed sensor 87, the rotation speeds Nm1, Nm2 of the motors MG1, MG2, a current speed ratio γ as a current speed ratio of the transmission 60 and a target speed ratio γ*, charge-discharge power demand Pb*, input limit Win of the battery 35, and output limit Wout of the battery 35 (Step S100). Here, the rotation speeds Nm1, Nm2 of the motors MG1, MG2 are inputted through communication from a motor ECU 30. The current speed ratio γ of the transmission 60 is a value stored in a predetermined region of a RAM 76 when the change speed of the transmission 60 has been completed, and the target speed ratio γ* is set according to the vehicle speed V, the torque demand and the like through a transmission processing routine, not shown, and stored in a predetermined region of the RAM 76. Moreover, the charge-discharge power demand Pb* is set as power to charge/discharge the battery 35 by the battery ECU 36 based on the state of charge SOC of the battery 35 and the like and inputted from the battery ECU 36 through communication. The input limit Win as the charge allowable power, which is power allowed for charging the battery 35 and output limit Wout as the discharge allowable power, which is power allowed for the discharge are set based on a battery temperature Tb of the battery 35 detected by the temperature sensor 37 and the state of charge SOC of the battery 35 is inputted from the battery ECU 36 through communication. The input limit Win, output limit Wout of the battery 35 can be set by setting basic values of input limit Win, output limit Wout based on the battery temperature Tb, by setting a correction coefficient for output limit and a correction coefficient for input limit based on the state of charge (SOC) of the battery 35, and by multiplying the basic values of input limit Win, output limit Wout set as above by the correction coefficients.

After data input processing at Step S100, torque demand Tr* to be outputted to the drive shaft 67 is set based on the inputted accelerator opening Acc and vehicle speed V, and power demand P* required for the entire hybrid vehicle 20 is set (Step S110). In the embodiment, a map for setting torque demand, not shown, in which a relation among the accelerator opening Acc, the vehicle speed V and the torque demand Tr* are determined in advance, is stored in the ROM 74, and the torque demand Tr* corresponding to the given accelerator opening Acc and vehicle speed V is derived/set from the map. In the embodiment, the power demand P* is calculated as a sum of a product of the torque demand Tr* set at Step S110 and the value obtained by multiplying the vehicle speed V indicating the rotation speed of the drive shaft 67 by a conversion coefficient k, the charge-discharge power demand Pb* (however, the charge demand side is positive), and a loss Loss. Then, it is determined if the engine 22 is kept stopped or not on the basis of the power demand P* set at Step S110, the output limit Wout (or state of charge SOC) inputted at Step S100 and the like, for example (Step S120). If it is determined at Step S120 that the engine 22 is to be kept stopped, it is further determined if the current speed ratio γ of the transmission 60 and the target speed ratio γ* inputted at Step S100 match each other or not (Step S130), and if the current speed ratio γ matches the target speed ratio γ*, it is determined to which of the first gear train to fourth gear train the current speed ratio γ corresponds (Step S140).

If the current speed ratio γ corresponds to the first gear train or third gear train, power is outputted only by the motor MG2, and first, a torque command Tm1* to the motor MG1 is set to a value 0 (Step S150). Then, by dividing the input limit Win and the output limit Wout of the battery 35 by the rotation speed Nm2 of the motor MG2 inputted at Step S100, respectively, torque limits Tmin, Tmin as the upper and lower limits of the torque which can be outputted from the motor MG2 are calculated (Step S160). Moreover, by using the torque demand Tr* set at Step S110, the current speed ratio γ and the reduction ratio ρr of the reduction gear mechanism 50, a tentative motor torque Tm2tmp as a torque to be outputted from the motor MG2 is calculated according to the following expression (1) (Step S170), and a torque command Tm2* of the motor MG2 is set as a value limiting the tentative motor torque Tm2tmp by the torque limits Tmin, Tmax calculated at Step S160 (Step S180). By setting the torque command Tm2* of the motor MG2 as above, the torque to be outputted by the motor MG2 can be set as a torque limited within a range of the input limit Win, output limit Wout of the battery 35. After setting the torque commands Tm1*, Tm2* of the motors MG1, MG2 as above, the set torque commands Tm1*, Tm2* are transmitted to the motor ECU 30 (Step S190) and the processing at Step S100 and after is executed again. The motor ECU 30 having received the torque commands Tm1*, Tm2* executes switching control of switching elements of the inverters 31, 32 so that the motors MG1, MG2 are driven according to the torque commands Tm1*, Tm2*.

$$Tm2tmp = -Tr^* / \gamma \cdot \rho r \tag{1}$$

On the other hand, if the current speed ratio γ corresponds to the second gear train or fourth gear train, power is outputted only by the motor MG1, and first, a torque command Tm1* to the motor MG2 is set to a value 0 (Step S200). Then, by dividing the input limit Win and the output limit Wout of the battery 35 by the rotation speed Nm1 of the motor MG1 inputted at Step S100, respectively, torque limits Tmin, Tmax as the upper and lower limits of the torque which can be outputted from the motor MG1 are calculated (Step S210). Moreover, by using the torque demand Tr* and the current speed ratio γ set at Step S110, a tentative motor torque Tm1tmp as a torque to be outputted from the motor MG1 is calculated according to the following expression (2) (Step S220), and a torque command Tm1* of the motor MG1 is set as a value limiting the tentative motor torque Tm2tmp by the torque limits Tmin, Tmax calculated at Step S210 (Step S230). By setting the torque command Tm1* of the motor MG1 as above, the torque to be outputted by the motor MG1 can be set as a torque limited within a range of the input limit Win, output limit Wout of the battery 35. After setting the torque commands Tm1*, Tm2* of the motors MG1, MG2 as above, the set torque commands Tm1*, Tm2* are transmitted to the motor ECU 30 (Step S190) and the processing at Step S100 and after is executed again.

$$Tm1tmp = Tr^* / \gamma \tag{2}$$

On the other hand, if it is determined that the engine 22 should be started at Step S120, the engine 22 shall output the power demand P*, a predetermined engine start flag Fes is set to a value 1 so that an engine start drive and control routine, not shown, is to be executed (Step S240), and this routine is finished. In this case, since both the motors MG1, MG2 are connected to the engine 22 through the power distribution and integration mechanism 40, cranking of the engine 22 by the motor MG1 or MG2, which results in no output of power according to the speed ratio of the transmission 60 is executed so as to start the engine 22. If it is determined at Step S130 that the current speed ratio γ does not match the target speed ratio γ*, in order to instruct execution of a first motor synchronization control routine so as to change the speed ratio of the transmission 60 from the current speed ratio γ to the target speed ratio γ*, a motor synchronization flag F1 is set to the value 1 (Step S250), the routine is finished, and the first motor synchronization control routine is executed as described below.

Figure 13:
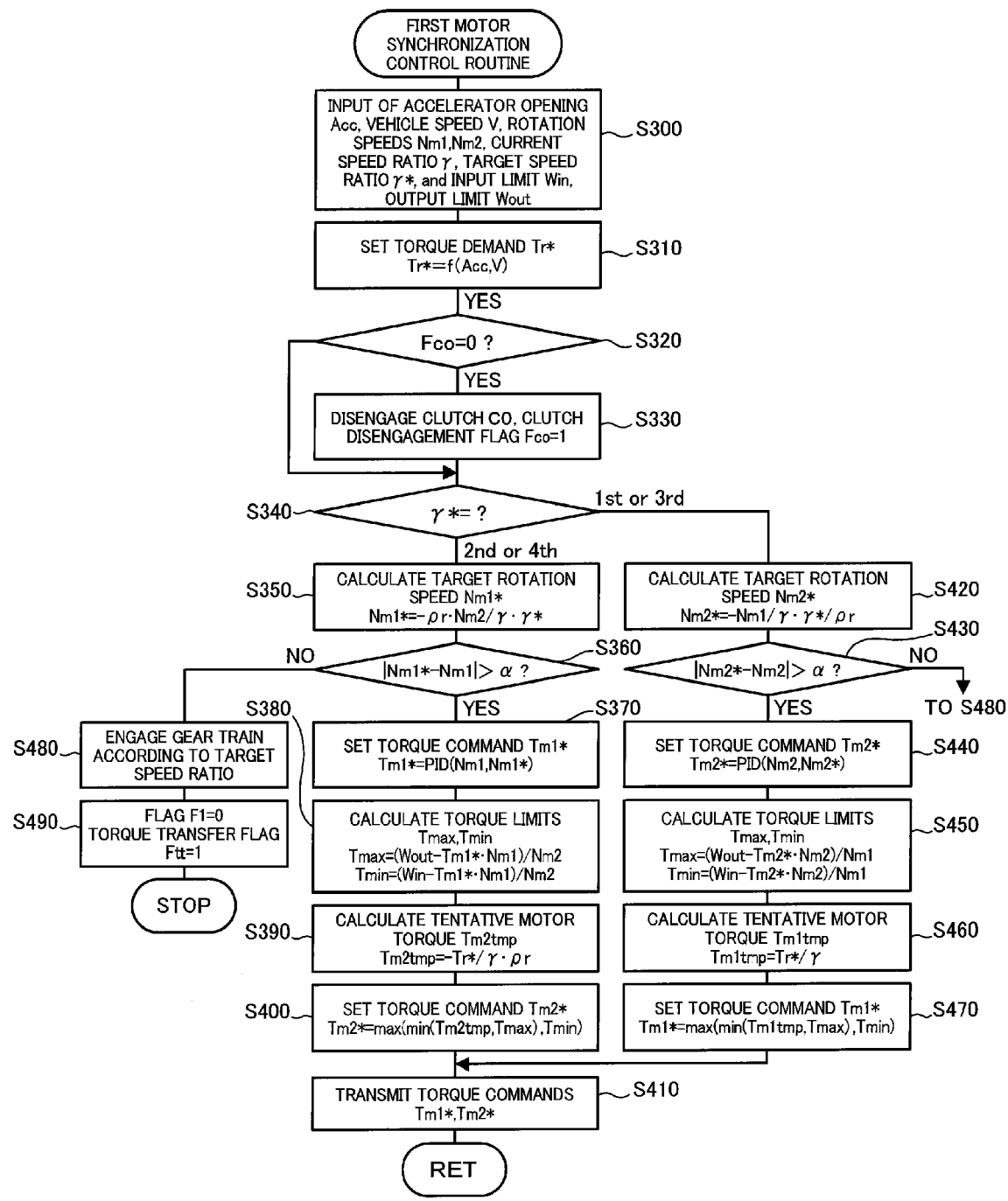
FIG. 13 is a flowchart illustrating an example of a first motor synchronization control routine executed by the hybrid ECU 70 in the embodiment.

FIG. 13 is a flowchart illustrating an example of the first motor synchronization control routine executed by the hybrid ECU 70. This routine is executed every predetermined time (every several msec, for example) when the motor synchronization flag F1 is set to the value 1. At start of the first motor synchronization control routine in FIG. 13, the CPU 72 of the hybrid ECU 70 executes input processing of data required for control such as the accelerator opening Acc, the vehicle speed V, the rotation speeds Nm1, Nm2 of the motors MG1, MG2, the current speed ratio γ and the target speed ratio γ* of the transmission 60, the input limit Win, output limit Wout of the battery 35 and the like similarly to Step S100 in FIG. 12 (Step S300). Then, based on the accelerator opening Acc and the vehicle speed V inputted at Step S300, the torque demand Tr* to be outputted to the drive shaft 67 is set (Step S310), and moreover, it is determined if a predetermined clutch disengagement flag Fco is a value 0 or not (Step S320). If the clutch disengagement flag Fco is the value 0, the actuator 88 is driven and controlled so that the clutch C0 is disengaged and the connection between the sun gear 41 and the first motor shaft 46 of the power distribution and integration mechanism 40 is disconnected and the clutch disengagement flag Fco is set to the value 1 (Step S330), and moreover, it is determined to which of the first gear train to fourth gear train the target speed ratio γ* corresponds (Step S340). If it is determined at Step S320 that the clutch disengagement flag Fco is the value 1, the processing at Step S330 is skipped, and the processing at step S340 is executed.

Figure 14:
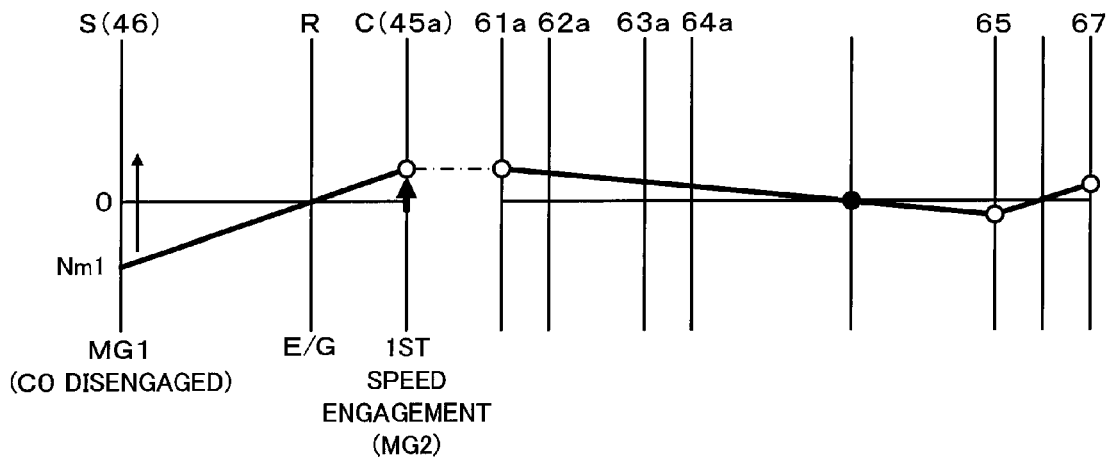
FIG. 14 is an explanatory diagram for explaining an operation when a change speed state of a transmission 60 is changed under the clutch engagement 1-motor running mode.
Figure 15:
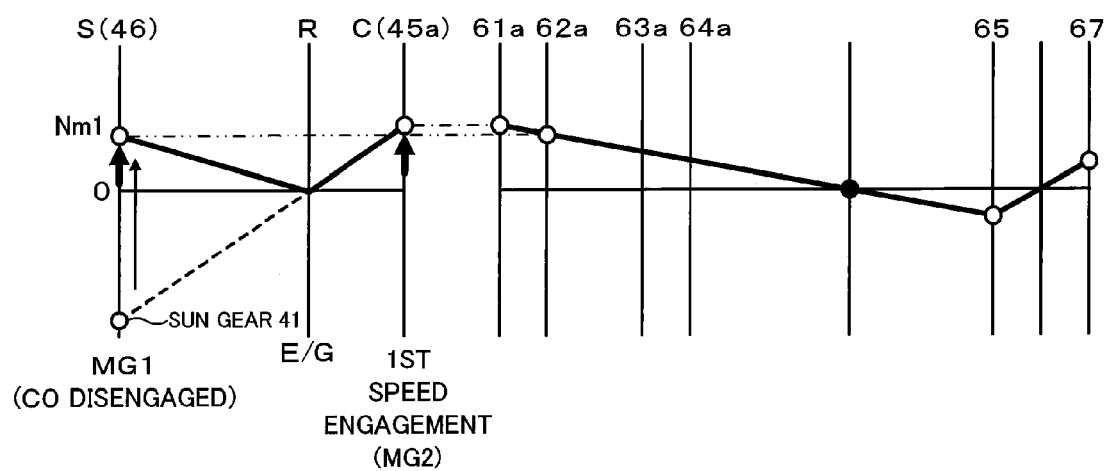
FIG. 15 is an explanatory diagram for explaining an operation when the change speed state of a transmission 60 is changed under the clutch engagement 1-motor running mode.

If it is determined at Step S340 that the target speed ratio γ* corresponds to the second gear train or fourth gear train, the current speed ratio γ corresponds to the first gear train or third gear train and only the motor MG2 outputs power at that stage. If the current speed ratio γ corresponds to the first gear train or third gear train as above, since the clutch C0 is engaged, the motor MG1 not outputting power corotates with the motor MG2 and runs idle, and the rotation speed Nm1 of the motor MG1 (first motor shaft 46) departs from the rotation speed of the second gear 62a of the second gear train or the fourth gear 64a of the fourth gear train. FIG. 14 shows a relation between the rotation speed Nm1 of the motor MG1 (first motor shaft 46) and the second gear 62a of the second gear train or the fourth gear 64a of the fourth gear train when the current speed ratio γ corresponds to the first gear train and the power outputted by the motor MG2 is transmitted to the drive shaft 67 through the first gear train of the transmission 60. Thus, if it is determined at Step S340 that the target speed ratio γ* corresponds to the second gear train or fourth gear train, the target rotation speed Nm1* of the motor MG1 is calculated according to the following expression (3) (Step S350) using the rotation speed Nm2 of the motor MG2 inputted at Step S300, the current speed ratio γ, the target speed ratio γ*, and the reduction ratio pr of the reduction gear mechanism 50 so that a rotation speed Nm1 of the motor MG1 is matched with the rotation speed of the second gear 62a or fourth gear 64a of the transmission 60 so as to connect the first motor shaft 46 to the second gear train or the fourth gear train. When the target rotation speed Nm1* of the motor MG1 is acquired as above, it is determined if an absolute value of a deviation between the target rotation speed Nm1* and the rotation speed Nm1 of the motor MG1 inputted at Step S300 exceeds a predetermined value α or not (Step S360), and if the absolute value exceeds the predetermined value α, calculation in the following expression (4) is executed on the basis of the target rotation speed Nm1* calculated at Step S350 and the rotation speed Nm1 of the motor MG1 so as to set the torque command Tm1* of the motor MG1 (Step S370). The expression (4) is a relational expression in feedback control for rotating the motor MG1 at the target rotation speed Nm1*, and in the expression (4), "k11", in the first term on the right side is a gain of a proportional term, and "k12" in the second term on the right side is a gain of an integral term. Then, by dividing a deviation between the input limit Win, output limit Wout of the battery 35 and power consumption (generated power) of the motor MG1 obtained as a product of the torque command Tm1* of the motor MG1 set at S370 and the current rotation speed Nm1 of the motor MG1 by the rotation speed Nm2 of the motor MG2, the torque limits Tmin, Tmax as the upper and lower limits of the torque that can be outputted from the motor MG2 are calculated (Step S380). Moreover, the tentative motor torque Tm2tmp as the torque to be outputted from the motor MG2 is calculated according to the above expression (1) (Step S390), and the torque command Tm2* of the motor MG2 is set as a value limiting the tentative motor torque Tm2tmp by the torque limits Tmin, Tmax calculated at Step S380 (Step S400). After setting the torque commands Tm1*, Tm2* of the motors MG1, MG2 as above, the set torque commands Tm1*, Tm2* are transmitted to the motor ECU 30 (Step S410), and the processing at Step S300 and after is executed again.

$$Nm1^* = -\rho r \cdot Nm2/\gamma \cdot \gamma^* \quad (3)$$

$$Tm1^* = k11(Nm1^* - Nm1) + k12\int(Nm1^* - Nm1)dt \quad (4)$$

If it is determined at Step S340 that the target speed ratio γ* corresponds to the first gear train or third gear train, the current speed ratio γ corresponds to the second gear train or fourth gear train and only the motor MG1 outputs power at that stage. In this case, the motor MG2 corotates with the motor MG1 and runs idle, and the rotation speed of the carrier shaft 45a (=pr Nm2) connected to the motor MG2 (second motor shaft 55) through the reduction gear mechanism 50 and the carrier 45 departs from the rotation speed of the first gear 61a of the first gear train or the third gear 63a of the third gear train. Thus, if it is determined at Step S340 that the target speed ratio γ* corresponds to the second gear train or fourth gear train, the target rotation speed Nm2* of the motor MG2 is calculated according to the following expression (5) (Step S420) using the rotation speed Nm1 of the motor MG1 inputted at Step S300, the current speed ratio γ, the target speed ratio γ*, and the reduction ratio pr of the reduction gear mechanism 50 so that the rotation speed Nm2 of the motor MG2 is synchronized with (made to correspond to) the rotation speed of the second gear 62a or fourth gear 64a of the transmission 60 so as to connect the carrier shaft 45a to the first gear train or the third gear train. Then, it is determined if an absolute value of a deviation between the calculated target rotation speed Nm2* and the rotation speed Nm2 of the motor MG2 inputted at Step S300 exceeds the predetermined value α or not (Step S430), and if the absolute value exceeds the predetermined value α, calculation in the following expression (6) is executed on the basis of the target rotation speed Nm2* calculated at Step S420 and the rotation speed Nm2 of the motor MG2 so as to set the torque command Tm2* of the motor MG2 (Step S440). The expression (6) is a relational expression in feedback control for rotating the motor MG2 at the target rotation speed Nm2*, and in the expression (6), "k21" in the first term on the right side is a gain of a proportional term, and "k22" in the second term on the right side is a gain of an integral term. Then, by dividing a deviation between the input limit Win, output limit Wout of the battery 35 and power consumption (generated power) of the motor MG2 obtained as a product of the torque command Tm2* of the motor MG2 set at S440 and the current rotation speed Nm2 of the motor MG2 by the rotation speed Nm1 of the motor MG1, the torque limits Tmin, Tmax as the upper and lower limits of the torque that can be outputted from the motor MG1 are calculated (Step S450). Moreover, the tentative motor torque Tm1tmp as the torque to be outputted from the motor MG1 is calculated according to the above expression (2) (Step S460), and the torque command Tm1* of the motor MG1 is set as a value limiting the tentative motor torque Tm2tmp by the torque limits Tmin, Tmax calculated at Step S450 (Step S470). After setting the torque commands Tm1*, Tm2* of the motors MG1, MG2 as above, the set torque commands Tm1*, Tm2* are transmitted to the motor ECU 30 (Step S410), and the processing at Step S300 and after is executed again.

$$Nm2^* = -Nm1/\gamma \cdot \gamma^*/\rho\gamma \quad (5)$$

$$Tm2^* = k21(Nm2^* - Nm2) + k22 \cdot (Nm2^* - Nm2)dt \quad (6)$$

After the above processing is repeatedly executed, one of the rotation speed Nm1 or Nm2 of the motors MG1 and MG2 which did not output power at start of the routine becomes substantially matched with the target rotation speed Nm1* or Nm2*, which results in negative determination at Step S360 or S430. When the negative determination is made at Step S360 or S430 as above, as exemplified in FIG. 15, the first motor shaft 46 or the carrier shaft 45a is rotated synchronously with any of the first to fourth gear trains corresponding to the target speed ratio γ*, and the actuator 88 is driven and controlled so that the first motor shaft 46 or the carrier shaft 45a is connected to any of the first to fourth gear trains corresponding to the target speed ratio γ* by the clutch C1 or C2 of the transmission 60 (Step S480). By this operation, the transmission 60 is set to any of the 1-2 speed simultaneous engagement state, 2-3 speed simultaneous engagement state, and 3-4 speed simultaneous engagement state. And the motor synchronization flag F1 is set to the value 0, and in order to instruct execution of the torque transfer routine for transferring power from one of the motors MG1 and MG2 which outputted power at start of the routine to the other, a torque transfer flag Ftt is set to the value 1 (Step S490) and then, the routine is finished and the torque transfer routine is executed as described below.

Figure 16:
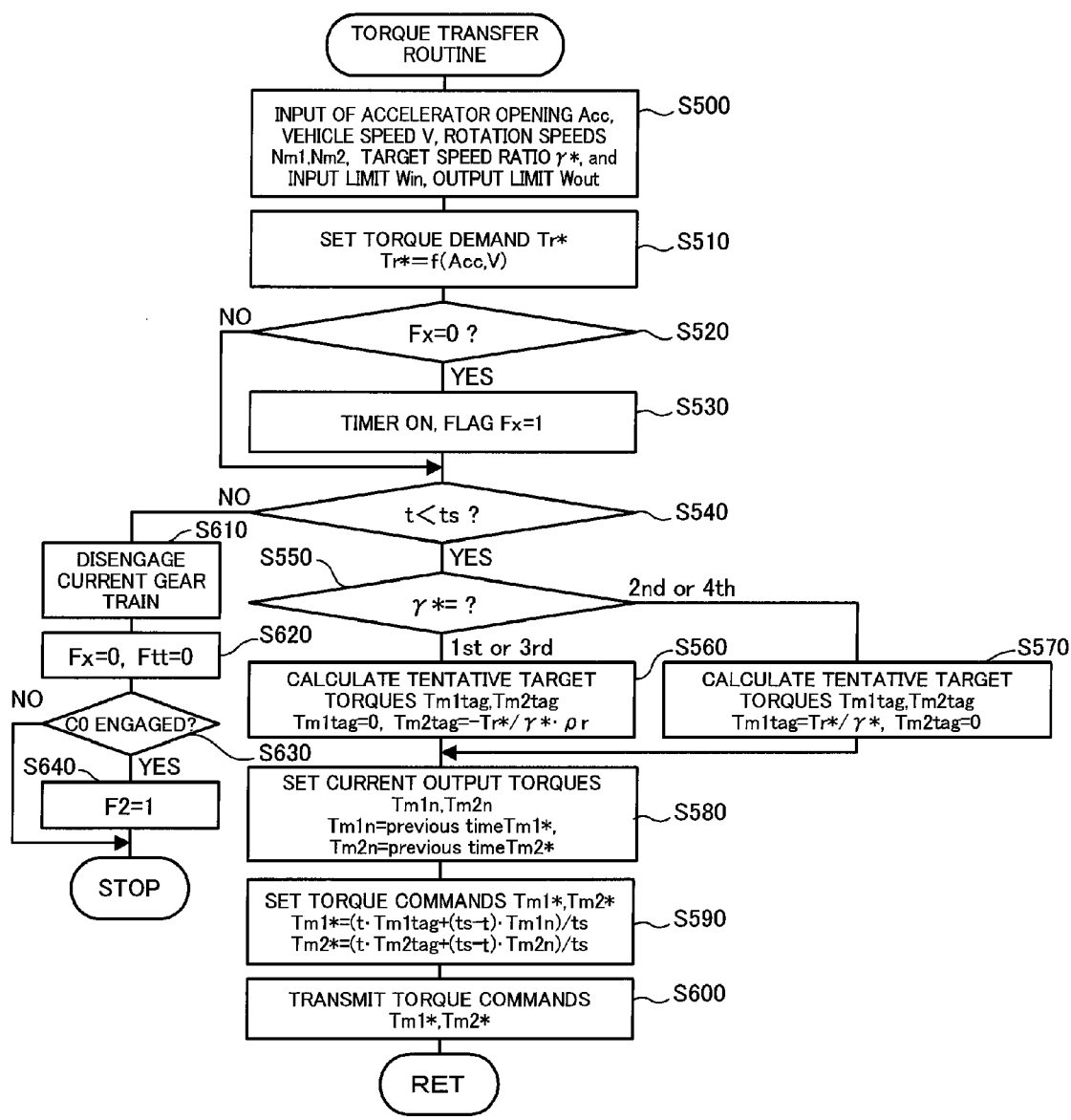
FIG. 16 is a flowchart illustrating an example of a torque transfer routine executed by the hybrid ECU 70 in the embodiment.

FIG. 16 is a flowchart illustrating an example of the torque transfer routine executed by the hybrid ECU 70. This routine is executed every predetermined time (every several msec, for example) when the torque transfer flag Ftt is set to the value 1. At start of the torque transfer routine in FIG. 16, the CPU 72 of the hybrid ECU 70 executes data input processing similar to Step S300 in FIG. 13 (except input of the current speed ratio γ) (Step S500), and then, the torque demand Tr* to be outputted to the drive shaft 67 is set (Step S510) and moreover, it is determined if a flag Fx indicating that the torque is being transferred is the value 0 or not (Step S520). If the flag Fx is the value 0, a predetermined timer, not shown, is turned on and the flag Fx is set to the value 1 (Step S530), and it is determined if a time t counted by the timer is less than a predetermined torque transfer time ts or not (Step S540). If the counted time t by the timer is less than the torque transfer time ts, it is determined to which of the first gear train to fourth gear train the target speed ratio γ* corresponds (Step S550). If the flag Fx is determined as the value 1 at Step S520, the processing at Step S530 is skipped and the processing at Step S540 is executed instead.

Here, the routine is a series of processing at a time when the torque transfer time ts has elapsed since its start that power from one of the motors MG1 and MG2 is reduced and the power from the other is increased so that the power of the motor MG1 or MG2 which has outputted the power till then becomes the value 0 and power outputted from the other of the motor MG2 or MG1 becomes a value based on the torque demand Tr* and the target speed ratio γ*. Thus, if the determining processing at Step S540 is executed, first, tentative target torques Tm1tag and Tm2tag, which are torques to be outputted from the motors MG1, MG2 when the torque transfer has been completed on the basis of the target speed ratio γ*, the torque demand Tr* at that time and the like are calculated. That is, if the target speed ratio γ* corresponds to the first gear train or third gear train, the power is to be outputted only by the motor MG2 in the end, and the tentative target torque Tm1tag of the motor MG1 is set at the value 0, and the tentative target torque Tm2tag of the motor MG2 is calculated according to the following expression (7) using the torque demand Tr* and the target speed ratio γ* set at Step S510 and the reduction ratio pr of the reduction gear mechanism 50 (Step S560). If the target speed ratio γ* corresponds to the second gear train or fourth gear train, the power is to be outputted only by the motor MG1 in the end, and the tentative target torque Tm2tag of the motor MG2 is set at the value 0, and the tentative target torque Tm1tag of the motor MG1 is calculated according to the following expression (8) using the torque demand Tr* and the target speed ratio γ* set at Step S510 (Step S570). When the processing at Step S560 or S570 is executed, the previous torque command value to the motors MG1, MG2 is set as current output torques Tm1n, Tm2n being outputted by the motors MG1 and MG2 at that time (Step S580), calculation of the following expressions (9) and (10) are executed on the basis of the tentative target torques Tm1tag and Tm2tag calculated at Step S570 and the current output torques Tm1n, Tm2n set at Step S580, and torque commands Tm1*, Tm2* are set for the motors MG1, MG2 (step S590). And the set torque commands Tm1*, Tm2* are transmitted to the motor ECU 30 (Step S600), and the processing at step S500 and after is executed again.

$$Tm2tag = -Tr^*/\gamma^* \cdot pr \quad (7)$$

$$Tm1tag = Tr^*/\beta^* \quad (8)$$

$$Tm1^* = (t \cdot Tm1tag + (ts-t) \cdot Tm1n)/ts \quad (9)$$

$$Tm2^* = (t \cdot Tm2tag + (ts-t) \cdot Tm2n)/ts \quad (10)$$

When the above processing is repeatedly executed, the torque commands Tm1*, Tm2* are set for the motors MG1 and MG2 on the basis of the power outputted by the motors MG1 and MG2, the torque demand Tr* and the target speed ratio γ* every predetermined time (execution cycle of this routine) so that the power based on the torque demand Tr* is outputted to the drive shaft 67 and the power transfer is completed in the torque transfer time ts. As a result, even if the torque demand Tr* is fluctuated during execution of the torque transfer routine, the power can be transferred between the motors MG1 and MG2 while the power based on the torque demand Tr* is more assuredly outputted to the drive shaft 67. When it is determined that the counted time t by the timer is the torque transfer time ts or more at Step S540, the power transfer between the motors MG1 and MG2 has been completed. Then the actuator 88 is driven and controlled so that the connection between the first motor shaft 46 or the carrier shaft 45a and any of the first to fourth gear trains corresponding to the current speed ratio γ (current gear train) is disconnected by the clutch C1 or C2 of the transmission 60 at that state (Step S610), and thus the change speed of the transmission 60 can be completed. At this stage, the target speed ratio 7* so far is stored as the current speed ratio γ in a predetermined memory region in the RAM 76. After the flag Fx and the torque transfer flag Ftt are set at the value 0 (Step S620), it is determined if the clutch C0 should be connected (should be engaged) or not according to a predetermined determination standard (Step S630), and if there is no need to connect the clutch C0, the routine is finished. If the clutch C0 does not have to be connected as above, the hybrid ECU 70 executes the 1-motor running drive and control routine in FIG. 12 again. On the other hand, if it is determined that the clutch C0 should be connected at Step S630, a predetermined motor synchronization flag F2 is set to the value 1 so that the clutch C0 can be connected (Step S640), the routine is finished, and execution of a second motor synchronization control routine, which will be described below, is started.

Here, if the motor synchronization flag F2 is not set to the value 1 at Step S630, the 1-motor running drive and control routine in FIG. 12 is executed while the clutch C0 is kept disengaged, and the hybrid vehicle 20 runs in the above clutch-disengaged 1-motor running mode. In such clutch-disengaged 1-motor running mode, the clutch C0 is disengaged and the connection between the sun gear 41 and the first motor shaft 46 is disconnected, and thus corotation of the crankshaft 26 of the non-operated engine 22 is avoided by the function of the power distribution and integration mechanism 40. Also in the clutch-disengaged 1-motor running mode, since corotation of the motor MG1 or MG2 not outputting power is avoided by the disengagement of the clutch C1 or C2 of the transmission 60, a drop in the power transmission efficiency can be restrained, inertia can be reduced and regenerative braking force can be increased by the motor MG1 or MG2, and thus fuel consumption can be improved. However, in the clutch-disengaged 1-motor running mode, since the motors MG1 and MG2 are substantially separated from the engine 22, driving power demand might be increased or the state of charge SOC of the battery 35 might be lowered, and when the engine 22 should be started, processing for connecting the clutch C0 should be executed before start of actuating the engine 22. Therefore, in the hybrid vehicle 20 in the embodiment, a determination standard based on the state of charge SOC of the battery 35 and the like, for example, is set in advance so as to determine if the clutch C0 should be connected or not at Step S630 in the torque transfer routine in FIG. 16, and if the clutch C0 should be connected, the second motor synchronization control routine is executed.

Figure 17:
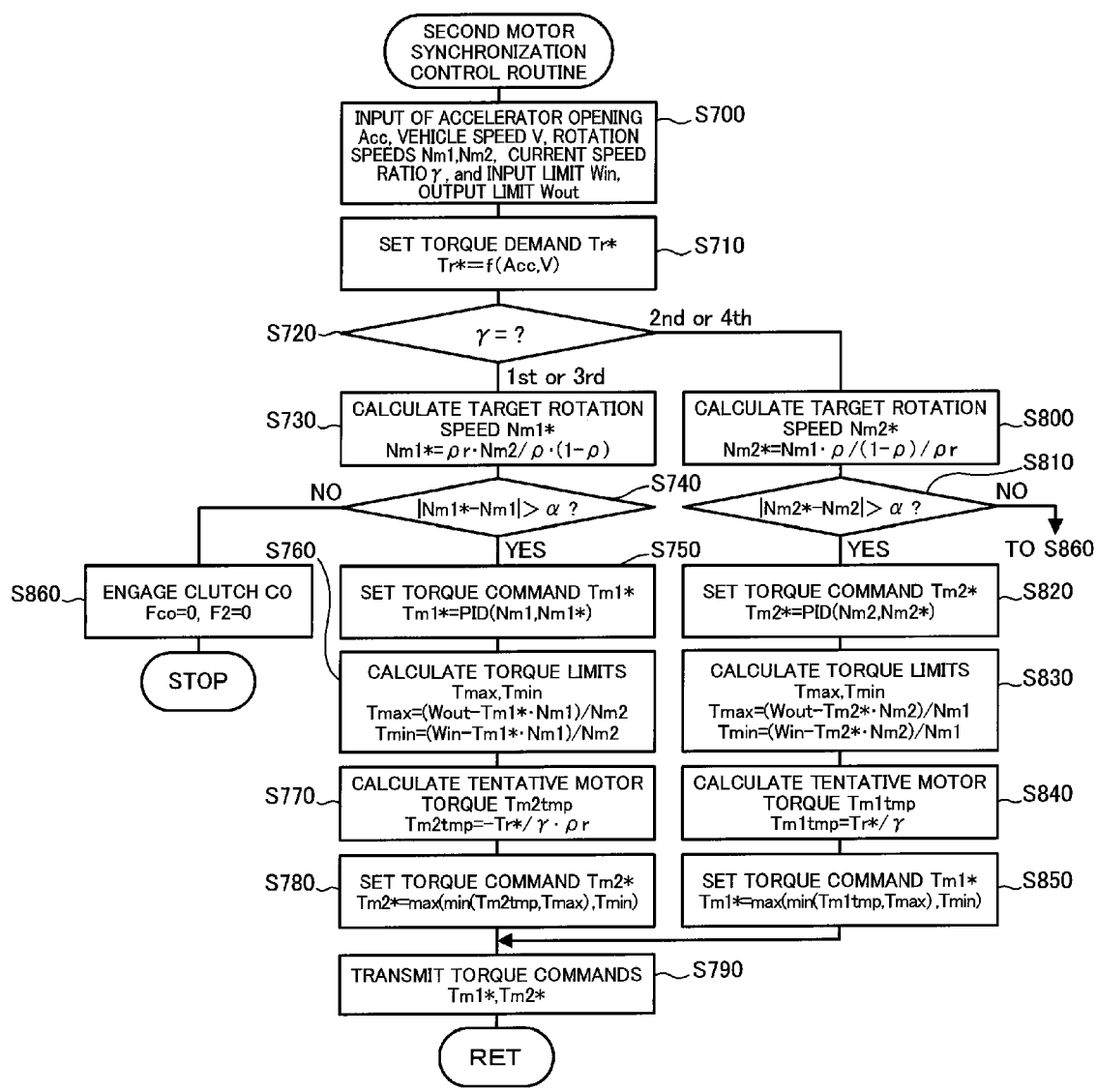
FIG. 17 is a flowchart illustrating an example of a second motor synchronization control routine executed by the hybrid ECU 70 in the embodiment.

FIG. 17 is a flowchart illustrating an example of the second motor synchronization control routine executed by the hybrid ECU 70. This routine is executed every predetermined time (every several msec, for example) if the motor synchronization flag F2 is set to the value 1. At start of the second motor synchronization control routine in FIG. 17, the CPU 72 of the hybrid ECU 70 executes input processing of data required for control such as the accelerator opening Acc, the vehicle speed V, the rotation speeds Nm1, Nm2 of the motors MG1, MG2, the current speed ratio γ of the transmission 60, the input limit Win, output limit Wout of the battery 35 and the like (Step S700), and the torque demand Tr* to be outputted to the drive shaft 67 is set (Step S710) and moreover, it is determined to which of the first gear train to fourth gear train the current speed ratio γ (target speed ratio γ* when the motor synchronization control routine or torque transfer routine is executed) corresponds (Step S720).

If the current speed ratio γ corresponds to the first gear train or the third gear train, the carrier shaft 45a is connected to the drive shaft 67 by the transmission 60 and only the motor MG2 outputs power, and since the clutch C0 is disengaged, the rotation speed Nm1 of the motor MG1 (first motor shaft 46) departs from the rotation speed of the sun gear 41 of the power distribution and integration mechanism 40 at engagement of the clutch C0. Thus, if the current speed ratio γ corresponds to the first gear train or the third gear train, in order that the motor MG1, that is, the first motor shaft 46 is to be rotated synchronously with the sun gear 41 of the power distribution and integration mechanism 40, by using the rotation speed Nm2 of the motor MG2 inputted at Step S700, the gear ratio ρ of the power distribution and integration mechanism 40, and the reduction ratio pr of the reduction gear mechanism 50, the target rotation speed Nm1* of the motor MG1 is calculated according to the following expression (11) (Step S730). The expression (11) is a calculation formula to match the rotation speed Nm1 of the motor MG1 (second motor) for which the connection with the drive shaft 67 has been disconnected with the rotation speed of the sun gear (second element) 41 at the driving source element connection on the basis of the rotation speed Nm2 of the motor MG2 (first motor) connected to the drive shaft 67, and that can be easily derived from the alignment chart in FIG. 9. When the target rotation speed Nm1* of the motor MG1 is acquired as above, it is determined if an absolute value of a deviation between the target rotation speed Nm1* and the rotation speed Nm1 of the motor MG1 inputted at Step S700 exceeds a predetermined value α or not (Step S740), and if the absolute value exceeds the predetermined value α, the processing at Step S750 to S780 similar to Step S370 to S400 in the first motor synchronization control routine in FIG. 13 is executed so as to set the torque commands Tm1* and Tm2* for the motors MG1 and MG2. And the set torque commands Tm1* and Tm2* are transmitted to the motor ECU 30 (Step S790), and the processing at S700 and after is executed again.

$$Nm1^* = \rho r \cdot Nm2/\rho \cdot (1-\rho) \quad (11)$$

On the other hand, if the current speed ratio γ corresponds to the second gear train or fourth gear train, the first motor shaft 46 is connected to the drive shaft 67 by the transmission 60 and only the motor MG1 outputs power, and since the clutch C0 is disengaged, the rotation speed (=ρr·Nm2) of the carrier shaft 45a departs from the rotation speed of the carrier 45 of the power distribution and integration mechanism 40 at engagement of the clutch C0. Thus, if the current speed ratio γ corresponds to the second gear train or fourth gear train, in order to have the rotation speed Nm2 of the motor MG2 synchronized with (corresponded to) the rotation speed at the engagement of the clutch C0 of the carrier 45, the target rotation speed Nm2* of the motor MG2 is calculated according to the following expression (12) using the rotation speed Nm1 of the motor MG1 inputted at Step S700, the gear ratio ρ of the power distribution and integration mechanism 40, and the reduction ratio pr of the reduction gear mechanism 50 (Step S800). The expression (12) is a calculation formula for the rotation speed Nm2 of the motor MG2 (first motor) in which the connection with the drive shaft 67 has been disconnected to be matched with the rotation speed of the carrier (first element) 45 at the driving source element connection based on the rotation speed Nm1 of the motor MG1 (second motor) connected to the drive shaft 67 and can be easily derived from the alignment chart in FIG. 10. When the target rotation speed Nm2* of the motor MG2 is acquired as above, it is determined if an absolute value of a deviation between the target rotation speed Nm2* and the rotation speed Nm2 of the motor MG1 inputted at Step S700 exceeds the predetermined value α or not (Step S810), and if the absolute value exceeds the predetermined value α, the processing at Steps S820 to S850 similar to Steps S440 to S470 in the first motor synchronization control routine in FIG. 13 is executed so as to set the torque commands Tm1* and Tm2* for the motors MG1 and MG2. And the set torque commands Tm1* and Tm2* are transmitted to the motor ECU 30 (Step S790), and the processing at S700 and after is executed again.

$$Nm2^* = Nm1 \cdot \rho/(1-\rho)/\rho r \quad (12)$$

Figure 18:
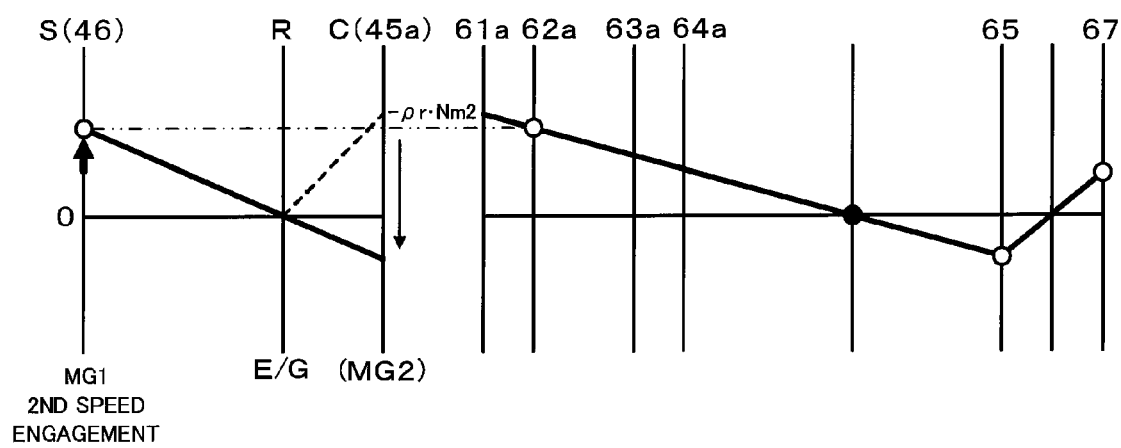
FIG. 18 is an explanatory diagram for explaining an operation when the change speed state of the transmission 60 is changed under the clutch engagement 1-motor running mode.

Above mentioned routine is a processing to match the rotation speed Nm1 or Nm2 of the motor MG1 or MG2, in which the connection with the drive shaft 67 has been disconnected, with the rotation speed of the sun gear 41 or the carrier 45 at the driving source element connection on the basis of the rotation speed Nm2 or Nm1 of the motor MG2 or MG1 connected to the drive shaft 67 (See FIG. 18). If the above processing is repeatedly executed, one of the rotation speed Nm1 or Nm2 of the motor MG1 or MG2 is substantially matched with the target rotation speed Nm1* or Nm2* and negative determination is made at Step S740 or S810. At the stage where the negative determination is made at Step S740 or S810 as above, the rotation speed Nm1 of the motor MG1 and the rotation speed Nm2 of the motor MG2 show a relation at the engagement of the clutch C0 (See FIG. 18), the actuator 88 is driven and controlled so that the sun gear 41 of the power distribution and integration mechanism 40 and the first motor shaft 46 are connected by the clutch C0 and moreover, the clutch disengagement flag Fco is set to the value 0 and the motor synchronization flag F2 to the value 0 (Step S860), and this routine is finished. Then, the hybrid ECU 70 executes the 1-motor running driven and control routine in FIG. 12 again.

As mentioned above, in the hybrid vehicle 20 of this embodiment, the power from one of the motors MG1 and MG2 can be transmitted to the drive shaft 67 while changing speed at a predetermined speed ratio by the transmission 60 by stopping the engine 22 while the driving source-element connection is established, which is the connection between the sun gear 41 of the distribution and integration mechanism 40 and the first motor shaft 46 by the clutch C0, and by connecting only one of the motors MG1 and MG2 to the drive shaft 67 by the transmission 60. In this state, if the connection between one of the motors MG1 and MG2 and the drive shaft 67 is disconnected and only the other of the motors MG1 and MG2 is connected to the drive shaft 67 by the transmission 60 so as to output the power, the power from the other of the motors MG1 and MG2 can be transmitted to the drive shaft 67 at a predetermine d speed ratio different from that at the connection of the one of the motors MG1 and MG2 to the drive shaft 67. When the power from the other of the motors MG1 and MG2 is to be transmitted to the drive shaft 67 with change in the speed ratio (change speed state) of the transmission 60 in a state where the power from one of the motors MG1 and MG2 is transmitted to the drive shaft 67 while the driving source-element connection is made as above, first, the driving source-element connection by the clutch C0 is disconnected (Step S330 in FIG. 13). Then the first motor synchronization control routine (FIG. 13) as the rotation speed adjusting process for adjusting the rotation speed Nm1 or Nm2 of the other of the motors MG1 and MG2 so that the other of the motors MG1 and MG2 can be connected to the drive shaft 67 in the state where the driving source-element connection is disconnected while the power based on the torque demand Tr* is being transmitted to the drive shaft 67, and the torque transfer routine (FIG. 16) as the power transfer process for transferring the power from one to the other of the motors MG1 and MG2 in the state where both the motors MG1 and MG2 are connected to the drive shaft 67 by the transmission 60 are executed, and then one of the motors MG1 and MG2 and the drive shaft 67 by the transmission 60 is disconnected (Step S610 in FIG. 16). By this operation, the other of the motors MG1 and MG2 can be connected to the drive shaft 67 and the power from the other of the motors MG1 and MG2 can be speed-changed and transmitted to the drive shaft 67 by the transmission 60. As a result, in the hybrid vehicle 20, the power outputted from the motor MG1 or MG2 can be efficiently transmitted to the drive shaft 67 with the change in the speed ratio (change speed state) of the transmission 60. As mentioned above, the hybrid vehicle 20 of this embodiment is provided with a power output apparatus which can efficiently transmit the power based on the torque demand Tr* to the drive shaft 67 while the power outputted from the motors MG1, MG2 is speed-changed by the transmission 60, and thus the hybrid vehicle 20 can favorably improve fuel consumption and running performance.

In the hybrid vehicle 20 in the embodiment, after the first motor synchronization control routine as the rotation speed adjusting process (FIG. 13), the torque transfer routine as the power transfer process (FIG. 16), and the disconnection of the connection between the one of the motors MG1 and MG2 and the drive shaft 67 by the transmission 60 (Step S610 in FIG. 16) are executed, if the clutch C0 disengaged at Step S330 in FIG. 13 is to be engaged again, the second motor synchronization control routine as the second rotation speed adjusting process (FIG. 17) for adjusting the rotation speed of one of the motors MG1 and MG2 which has been disconnected from the drive shaft 67 has been disconnected so as to enable the driving source-element connection and the driving source element connection (Step S860 in FIG. 17) are executed while the motors MG1 and MG2, the clutch C0 and the transmission 60 are controlled so that the power based on the torque demand Tr* is outputted to the drive shaft 67. By executing the driving source-element connection after disconnection between one of the motors MG1 and MG2 and the drive shaft 67 to stop output of the power and adjustment of the rotation speed Nm1 or Nm2 of one of the motors MG1 and MG2 which has been disconnected from the drive shaft 67 so as to enable the driving source element connection while the power based on the torque demand Tr* is outputted to the drive shaft 67, the engine 22 can be promptly started by cranking the engine 22 by one of the motors MG1 and MG2 when the power is outputted to the drive shaft 67 from the other of the motors MG1 and MG2 through the transmission 60.

Moreover, the torque transfer routine in FIG. 16 as the power transfer process is process for setting the torque commands Tm1*, Tm2* for the motors MG1 and MG2 every predetermined time on the basis of the current output torques Tm1n, Tm2n of the motors MG1 and MG2, the torque demand Tr*, and the target speed ratio γ* so that the power based on the torque demand Tr* is outputted to the drive shaft 67 and the power transfer is completed within the torque transfer time ts. Thus, in the hybrid vehicle 20, even if the torque demand Tr* fluctuates during execution of the torque transfer routine, the power can be transferred between the motors MG1 and MG2 while the power based on the set torque demand Tr* can be outputted to the drive shaft 67 more assuredly. However, it is only necessary that the torque transfer routine is such process decreasing the power from one of the motors MG1 and MG2 and increasing the power from the other of the motors MG1 and MG2 so that the power outputted form one of the motors MG1 and MG2 becomes the value 0 when the torque transfer time ts has elapsed from its start and the power outputted from the other of the motors MG1 and MG2 becomes a value based on the torque demand Tr* and the target speed ratio γ* (the speed ratio of the transmission 60 after the connection between the motor MG1 or MG2 and the drive shaft 67 is disconnected at Step S610 in FIG. 16). Thus, the hybrid vehicle 20 may be so configured that the torque transfer routine exemplified in FIG. 19 is executed instead of the torque transfer routine in FIG. 16.

Figure 19:
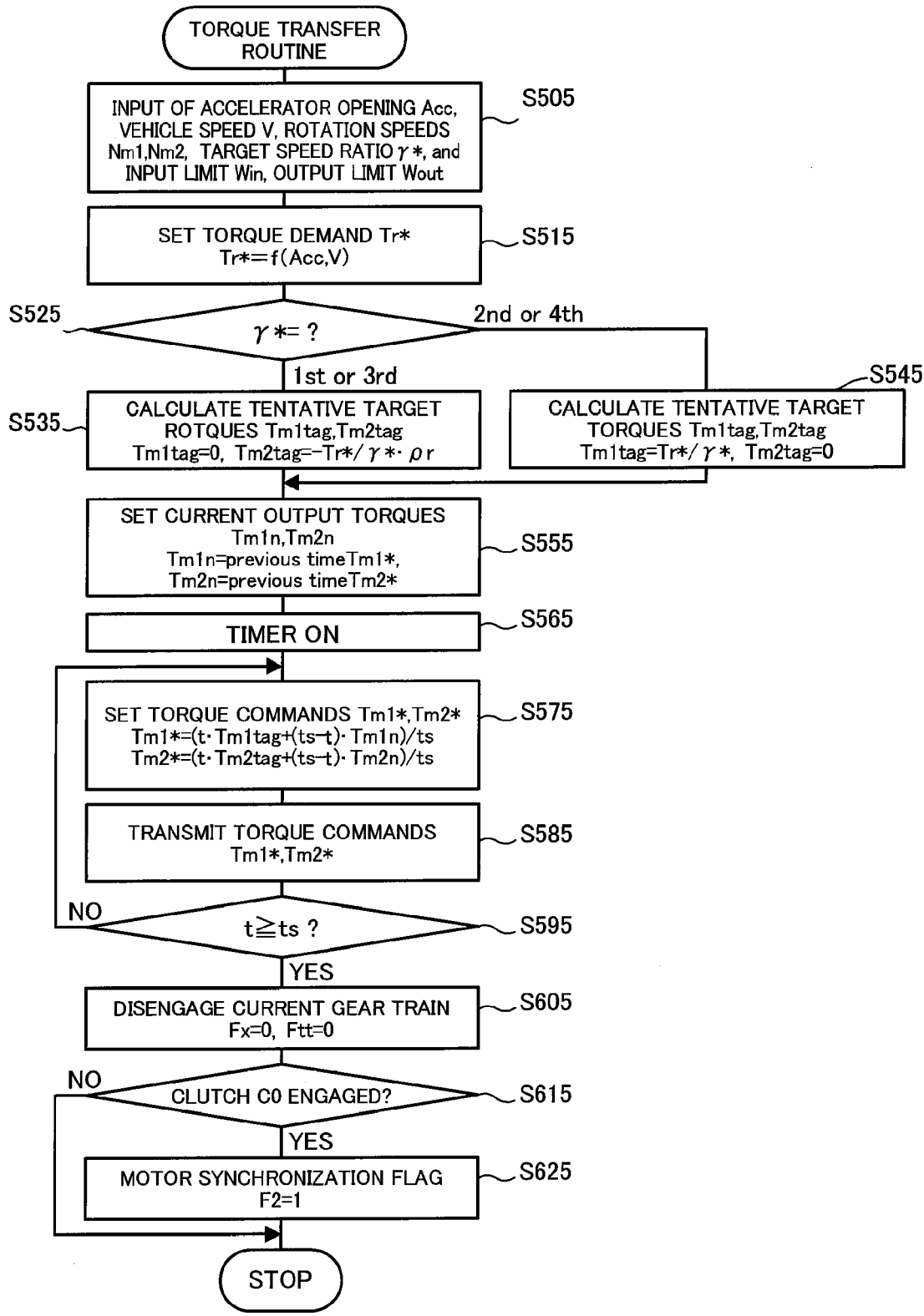
FIG. 19 is a flowchart illustrating a variation of the torque transfer routine.

When the torque transfer routine in FIG. 19 is to be executed, data input (Step S505) similar to Step S500 in FIG. 16 and setting of the torque demand Tr* (Step S515) similar to Step S510 in FIG. 16 are executed. Moreover, similarly to Steps S550, S560, S570, and S580 in FIG. 16, determination of the target speed ratio γ* (Step S525), setting of the tentative target torques Tm1tag, Tm2tag (Step S535 or S545), and setting of the current output torques Tm1n, Tm2n (Step S55S) are executed. After the processing at Step S555, the timer is turned on (Step S565), and then, setting of the torque commands Tm1*, Tm2* based on the tentative target torques Tm1tag, Tm2tag and the current output torques Tm1n, Tm2n at start of this routine set at Steps S535 to S555 (Step S575) and transmission of the torque commands Tm1*, Tm2*(Step S585) are repeatedly executed till the count time t by the timer becomes the torque transfer time ts or more at Step S595. The actuator 88 is driven and controlled so that the connection between the first motor shaft 46 or the carrier shaft 45a and any one of the first to the fourth gear trains (current gear train) corresponding to the current speed ratio γ is disconnected at a time when the torque transfer time ts has elapsed from start of this routine, the flags Fx and Ftt are set to the value 0 (Step S605), and moreover, processing similar to Steps S630 and S640 in FIG. 16 (Steps S615, S625) is executed and this routine is finished. The torque transfer routine as the power transfer process may be process for setting a torque command to the motors MG1 and MG2 based on the current output torques Tm1n, Tm2n of the motors MG1 and MG2 at the start, torque demand Tr* and the target speed ratio γ* so that transfer of the power is completed within the torque transfer time ts as mentioned above. By this operation, the power can be transferred between the motors MG1 and MG2 while fluctuation in the power outputted to the drive shaft 67 caused by a difference in response to the torque command between the motors MG1 and MG2 and the like is restricted.

The transmission 60 in the embodiment is a parallel-shaft type transmission including a first transmission mechanism having a first gear train and a third gear train, which are parallel-shaft type gear trains that can connect the carrier 45 as the first element of the power distribution and integration mechanism 40 to the drive shaft 67 and a second transmission mechanism having a second gear train and a fourth gear train, which are parallel-shaft type gear trains that can connect the first motor shaft 46 of the motor MG1 to the drive shaft 67. Therefore, according to the transmission 60, either one of the first motor shaft 46 and the carrier 45 (carrier shaft 45a) of the motor MG1 or the both can be selectively connected to the drive shaft 67. However, in the hybrid vehicle 20 in the embodiment, a planetary gear type transmission may be employed instead of the parallel-shaft type transmission 60.

Figure 20:
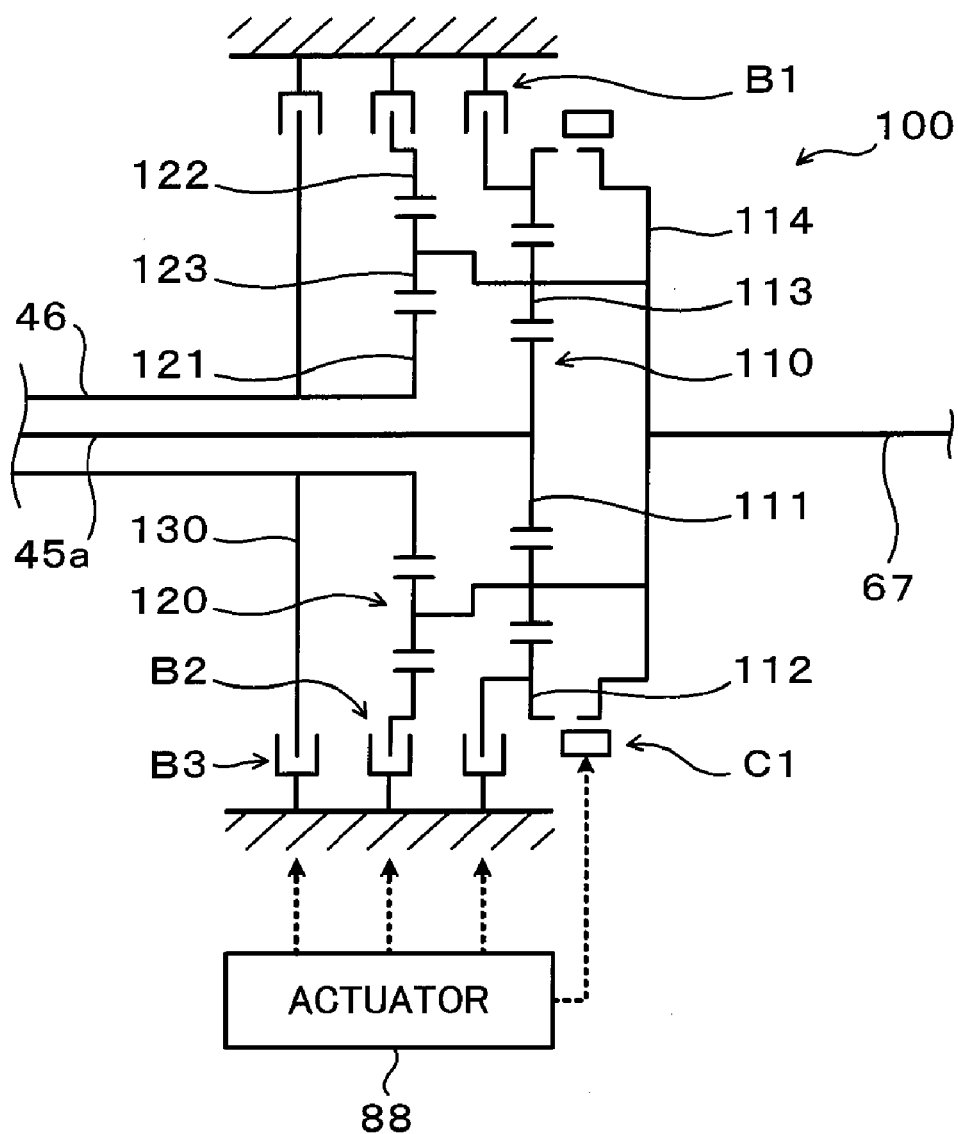
FIG. 20 is a schematic block diagram illustrating another transmission 100 which can be applied to the hybrid vehicle 20 in the embodiment.

FIG. 20 is a schematic block diagram illustrating a planetary gear type transmission 100 which can be applied to the hybrid vehicle 20 of the embodiment. The transmission 100 shown in the figure is also capable of setting a speed ratio (change speed state) to a plurality of stages and includes a first planetary gear mechanism 110 for transmission which can connect the carrier 45 (carrier shaft 45a) as the first element of the power distribution and integration mechanism 40 to the drive shaft 67, a second planetary gear mechanism 120 for transmission which can connect the first motor shaft 46 of the motor MG1 to the drive shaft 67, a brake B1 (first fixing mechanism) provided for the first planetary gear mechanism 110 for transmission, a brake B2 (second fixing mechanism) provided for the second planetary gear mechanism 120 for transmission, a brake B3 (third fixing mechanism), a clutch C1 (engagement/disengagement mechanism for transmission) and the like. The first planetary gear mechanism 110 for transmission and the brake B1 constitute the first transmission mechanism of the transmission 100, and the second planetary gear mechanism 120 for transmission and the brake B2 constitute the second transmission mechanism of the transmission 100. As shown in FIG. 20, the first planetary gear mechanism 110 for transmission is a single pinion-type planetary gear mechanism having a sun gear 111 connected to the carrier shaft 45a, a ring gear 112 as an internal gear arranged concentrically on the sun gear 111, and a carrier 114 holding a plurality of pinion gears 113 meshed with both the sun gear 111 and the ring gear 112 and connected to the drive shaft 67, and the sun gear 111 (input element), the ring gear 112 (fixable element), and the carrier 114 (output element) are constituted capable of mutually differential rotation. The second planetary gear mechanism 120 for transmission is a single-pinion type planetary gear mechanism having a sun gear 121 connected to the first motor shaft 46, a ring gear 122 as the internal gear arranged concentrically with the sun gear 121, and the carrier 114 holding a plurality of pinion gears 123 meshed with both the sun gear 121 and the ring gear 122 and common to the first planetary gear mechanism 110 for transmission, and the sun gear 121 (input element), the ring gear 122 (fixable element), and the carrier 114 (output element) are constituted capable of mutually differential rotation. In the example in FIG. 20, the second planetary gear mechanism 120 for transmission is provided side by side so as to be located coaxially and in the front of the vehicle with respect to the first planetary gear mechanism 110 for transmission, and a gear ratio ρ2 (the number of teeth of the sun gear 121/the number of teeth of the ring gear 122) of the second planetary gear mechanism 120 for transmission is set slightly larger than a gear ratio ρ1 (the number of teeth of the sun gear 111/the number of teeth of the ring gear 112) of the first planetary gear mechanism 110 for transmission.

The brake B1 is capable of fixing the ring gear 112 of the first planetary gear mechanism 110 for transmission unrotatably with respect to the transmission case and disconnecting the ring gear 112 so as to make it rotatable and can be driven by the above electric, electromagnetic or hydraulic actuator 88. The brake B2 is capable of fixing the ring gear 122 of the second planetary gear mechanism 120 for transmission unrotatably with respect to the transmission case and disconnecting the ring gear 122 so as to make it rotatable and can be driven by the actuator 88 similarly to the brake B1. Moreover, the brake B3 is capable of fixing the first motor shaft 46, that is, the sun gear 41 as the second element of the power distribution and integration mechanism 40 through a fixing element 130 fixed to the first motor shaft 46 unrotatably with respect to the transmission case and making the first motor shaft 46 rotatable by disconnecting the fixing element 130 and can be driven by the actuator 88 similarly to the brakes B1, B2. The clutch C1 can execute connection between the carrier 114 as the output element of the first planetary gear mechanism 110 for transmission and the ring gear 112 as the fixable element and disconnection of the connection and can be driven by the actuator 88 similarly to the brakes B1 to B3. The clutch C1 can be constituted as a dog clutch which can mesh a dog fixed to the carrier 114 and a dog fixed to the ring gear 112 with a smaller loss and can disengage the mesh between the both, for example. The power transmitted from the carrier 114 of the transmission 100 to the drive shaft 67 is outputted to the rear wheels 69a, 69b as drive wheels through the differential gear 68 in the end. The transmission 100 constituted as above can reduce the size in the axial direction and the radial direction as compared with the parallel-shaft type transmission, for example. Since the first planetary gear mechanism 110 for transmission and the second planetary gear mechanism 120 for transmission can be arranged on the downstream side of the engine 22, the motors MG1, MG2 and the power distribution and integration mechanism 40 coaxially with them, bearings can be simplified and the number of bearings can be reduced by using the transmission 100.

In the transmission 100, the speed ratio can be set in a plurality of stages as described below. That is, by fixing the ring gear 112 of the first planetary gear mechanism 110 for transmission to the transmission case unrotatably by the brake B1, the power from the carrier shaft 45a can be speed-changed and transmitted to the drive shaft 67 at a speed ratio (ρ1/(1+ρ1)) based on the gear ratio ρ1 of the first planetary gear mechanism 110 for transmission (hereinafter this state is referred to as the "first change speed state (first speed)". By fixing the ring gear 122 of the second planetary gear mechanism 120 for transmission to the transmission case unrotatably by the brake B2, the power from the first motor shaft 46 can be speed-changed and transmitted to the drive shaft 67 at a speed ratio (ρ2/(1+ρ2)) based on the gear ratio ρ2 of the second planetary gear mechanism 120 for transmission (hereinafter this state is referred to as the "second change speed state (second speed)". Moreover, by connecting the carrier 114 of the first planetary gear mechanism 110 for transmission to the ring gear 112 by the clutch C1, the sun gear 111, the ring gear 112, and the carrier 114 constituting the first planetary gear mechanism 110 for transmission are substantially locked and integrally rotated, and thus, the power from the carrier shaft 45a can be transmitted to the drive shaft 67 at the speed ratio 1 (hereinafter this state is referred to as the "third change speed state (third speed)". In addition, in the first change speed state in which the ring gear 112 is fixed by the brake B1 and the carrier 45 of the power distribution and integration mechanism 40 and the drive shaft 67 are connected by the first planetary gear mechanism 110 for transmission (first transmission mechanism), by fixing the ring gear 122 by the brake B2 constituting the second transmission mechanism, the first motor shaft 46 is also connected to the drive shaft 67 by the second planetary gear mechanism 120 for transmission (second transmission mechanism), and power from the engine 22 or the power from at least either one of the motors MG1 and MG2 can be mechanically (directly) transmitted to the drive shaft 67 at a fixed speed ratio (this state is called as the "1-2 speed simultaneous engagement state"). Also, by connecting the carrier 114 as the output element of the first planetary gear mechanism 110 for transmission corresponding to the clutch C1 to the ring gear 112 as the fixable element by the clutch C1 in the second change speed state in which the ring gear 122 of the second planetary gear mechanism 120 for transmission not corresponding to the clutch C1 as the engaging/disengaging mechanism for transmission is unrotatably fixed, both the first motor shaft 46 and the carrier 45 can be connected to the drive shaft 67, and power from the engine 22 or the power from at least either one of the motors MG1 and MG2 can be mechanically (directly) transmitted to the drive shaft 67 at a fixed speed ratio different from the 1-2 speed simultaneous engagement state (this state is called as the "2-3 speed simultaneous engagement state") Moreover, in the third change speed state in which the carrier 114 of the first planetary gear mechanism 110 for transmission is connected to the ring gear 112 by the clutch C1, by unrotatably fixing the first motor shaft 46, that is, the sun gear 41 as the second element of the power distribution and integration mechanism 40 with respect to the transmission case through the fixing element 130 fixed to the first motor shaft 46 by the brake B3, the power from the engine 22 or the power from the motor MG2 can be mechanically (directly) transmitted to the drive shaft 67 at a fixed speed ratio different from the 1-2 speed simultaneous engagement state or 2-3 speed simultaneous engagement state (this state is called as the "3rd speed fixed state"). Also, in the first change speed state in which the ring gear 112 is fixed by the brake B1 and the carrier 45 of the power distribution and integration mechanism 40 and the drive shaft 67 are connected by the first planetary gear mechanism 110 for transmission, by unrotatably fixing the first motor shaft 46, that is, the sun gear 41 as the second element of the power distribution and integration mechanism 40 with respect to the transmission case through the fixing element 130 fixed to the first motor shaft 46 by the brake B3, the power from the engine 22 or the motor MG2 can be mechanically (directly) transmitted to the drive shaft 67 at a fixed speed ratio different from the 1-2 speed simultaneous engagement state, 2-3 speed simultaneous engagement state or the 3rd speed fixed state (This state is called as the "1st speed fixed state"). As mentioned above, even by employing the planetary gear type transmission 100, the same working effect can be obtained as with the case of using the parallel-shaft type transmission 60.

Figure 21:
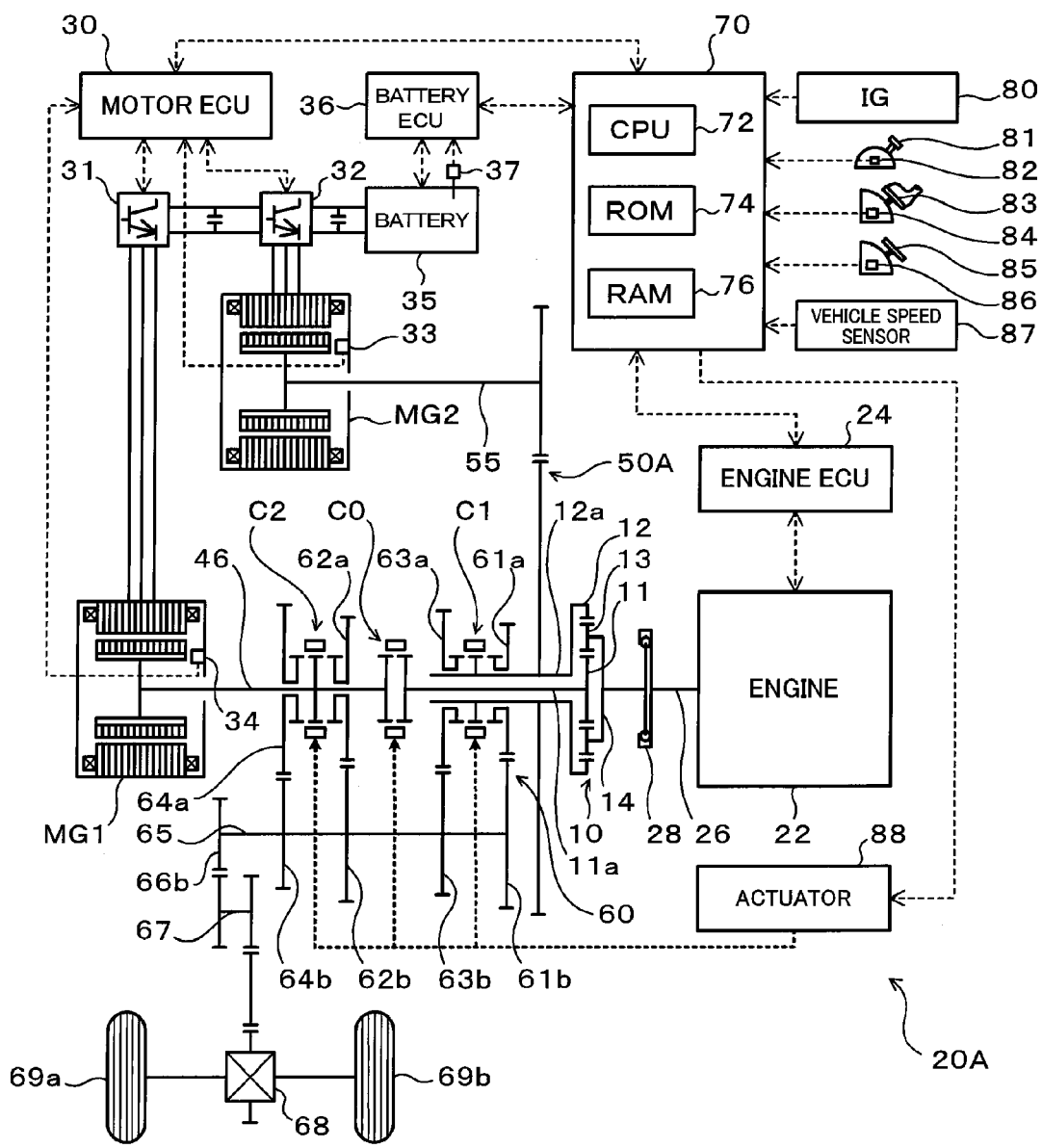
FIG. 21 is a schematic block diagram of a hybrid vehicle 20A of a variation.

FIG. 21 is a schematic block diagram illustrating a hybrid vehicle 20A of a variation. Though the above-mentioned hybrid vehicle 20 is constituted as a rear-drive vehicle, the hybrid vehicle 20A of the variation is constituted as a front drive vehicle. The hybrid vehicle 20A is provided with, as shown in FIG. 21, a power distribution and integration mechanism 10, which is a single-pinion type planetary gear mechanism including a sun gear 11, a ring gear 12 arranged concentrically with the sun gear 11, and a carrier 14 holding a plurality of pinion gears 13 meshed both with the sun gear 11 and the ring gear 12. In this case, the engine 22 is arranged laterally, and the crankshaft 26 of the engine 22 is connected to the carrier 14 as a third element of the power distribution and integration mechanism 10. Also, a hollow ring gear shaft 12a is connected to the ring gear 12 as the first element of the power distribution and integration mechanism 10, and the motor MG2 is connected to the ring gear shaft 12a through a reduction gear mechanism 50A as a parallel-shaft type gear train and the second motor shaft 55 extending in parallel with the first motor shaft 46. To the ring gear shaft 12a, either one of the first gear train (gear 61a) and the third gear train (gear 63a) constituting the first transmission mechanism of the transmission 60 can be selectively fixed by the clutch C1. Moreover, a sun gear shaft 11a is connected to the sun gear 11 as the second element of the power distribution and integration mechanism 10, and the sun gear shaft 11a is connected to the clutch C0 through the hollow ring gear shaft 12a and can be connected to the first motor shaft 46, that is, the motor MG1 through the clutch C0. To the first motor shaft 46, either one of the second gear train (gear 62a) and the fourth gear train (gear 64a) constituting the second transmission mechanism of the transmission 60 can be selectively fixed to the transmission 60 using the clutch C2. As mentioned above, the hybrid vehicle of the present invention may be constituted as a front drive vehicle.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

That is, in the above embodiment, the clutch C0 is provided between the sun gear 41 as the second element of the power distribution and integration mechanism 40 and the motor MG1 as the second motor for executing connection and disconnection between the both, but it may be provided between the carrier 45 as the first element of the power distribution and integration mechanism 40 and the motor MG2 as the first motor for executing the connection and disconnection between the both or may be provided between the ring gear 42 as the third element of the power distribution and integration mechanism 40 and the crankshaft 26 of the engine 22 for executing connection and disconnection between the both. The power distribution and integration mechanism provided at the hybrid vehicle 20 may be a planetary gear mechanism including a first sun gear and a second sun gear having the numbers of teeth different from each other, and a carrier holding at least one stepped gear constituted by connecting a first pinion gear meshed with the first sun gear and a second pinion gear meshed with the second sun gear. Moreover, the power distribution and integration mechanism provided at the hybrid vehicle 20 may be a single-pinion type planetary gear mechanism including a sun gear, a ring gear, and a carrier holding at least one pinion gear meshed both with the sun gear and the ring gear. Also, the hybrid vehicles 20, 20A may be constituted as a four-wheel drive vehicle either of a rear-drive base or a front-drive base. Moreover, in the embodiment, any of the clutch C0 and the clutches C1 and C2 of the transmission 60 is a dog clutch, which is a mechanical dog clutch with a smaller loss, but the clutches C0 to C2 may be constituted as a wet multiplate clutch. In addition, before the torque transfer flag is set to the value 1 at Step S490 in the first motor synchronization control routine shown in FIG. 13, it may be determined if transfer should be made to a 2-motor running mode or not. That is, if the processing at step S480 in FIG. 13 is completed, the transmission 60 is set to either of the 1-2 speed simultaneous engagement state, 2-3 speed simultaneous engagement state and the 3-4 speed simultaneous engagement state, and not by executing the torque transfer routine but executing the 2-motor running drive and control routine, not shown, the hybrid vehicle 20 can be run in the 2-motor running mode. Therefore, at transfer from the 1-motor running clutch engaged mode or clutch-disengaged 1-motor running mode to the 2-motor running mode, it is only necessary to execute the first motor synchronization control routine in FIG. 13. In the above embodiment, the power output apparatus has been described to be mounted on the hybrid vehicles 20, 20A, but the power output apparatus according to the present invention may be mounted on a moving body such as vehicles other than automobiles, boats, and aircrafts or may be incorporated in a fixed facility such as a construction facility.

The invention claimed is:

1. A power output apparatus for outputting power to a drive shaft, the power output apparatus comprising:
an internal combustion engine;
a first motor capable of inputting and outputting power;
a second motor capable of inputting and outputting power;
an accumulator unit capable of exchanging electric power with each of the first and second motors;
a power distribution and integration mechanism having a first element connected to a rotating shaft of the first motor, a second element connected to a rotating shaft of the second motor, and a third element connected to an engine shaft of the internal combustion engine, the power distribution and integration mechanism constituted so that each of the first, second, and third elements are capable of mutually differential rotation;
a connecting/disconnecting unit capable of a driving source-element connection and a disconnection of the driving source-element connection, the driving source-element connection being any one of a connection between the first motor and the first element, a connection between the second motor and the second element, and a connection between the internal combustion engine and the third element;
a transmission mechanism capable of selectively connecting either one or both of the rotating shaft of the first motor and the rotating shaft of the second motor to the drive shaft, the transmission mechanism also capable of transmitting the power from the first motor and the power from the second motor to the drive shaft at respective predetermined speed ratios;
a power demand setting module for setting power demand, which is power required for the drive shaft; and
a transmission control module programmed to control the first and second motors, the connecting/disconnecting unit, and the transmission mechanism so that power based on the set power demand is outputted to the drive shaft,
wherein the transmission control module is further programmed to control the connecting/disconnecting unit, when the internal combustion engine is stopped, to make the driving source-element connection so that only one of the first and second motors is connected to the drive shaft by the transmission mechanism and the power is outputted by one of the first and second motors,
wherein the transmission control module is still further programmed to control the first and second motors, the connecting/disconnecting unit, and the transmission mechanism so that only the other of said first and second motors is connected to the drive shaft by the transmission mechanism and the power is outputted by the other of the first and second motors while performing the disconnection of the driving source-element connection,
wherein the transmission control module is further programmed to carry out a rotation speed adjustment process for adjusting a rotation speed of the other of the first and second motors to be substantially the same as a rotation speed of the one of the first and second motors, so that the other of the first and second motors can be connected to the drive shaft while the driving source-element connection is disconnected,
wherein the transmission control module is also programmed to carry out a power transfer process for transferring the power from one of the first and second motors to the other of the first and second motors while both of the first and second motors are connected to the drive shaft by the transmission mechanism,
wherein the transmission control module is further programmed to carry out a disconnection of the connection between one of the first and second motors and the drive shaft by the transmission mechanism, and
wherein the transmission mechanism is a planetary gear type transmission including a first planetary gear mechanism for transmission having an input element connected to either one of the first and second elements of the power distribution and integration mechanism, an output element connected to the drive shaft, and a fixable element and constituted so that these three elements are capable of mutually differential rotation, a first fixing mechanism capable of unrotatably fixing the fixable element of the first planetary gear mechanism, a second planetary gear mechanism for transmission having an input element connected to the rotating shaft of the first or second motor corresponding to the other of the first and second elements, an output element connected to the drive shaft, and a fixable element and constituted so that these three elements are capable of mutually differential rotation, and a second fixing mechanism capable of unrotatably fixing the fixable element of the second planetary gear mechanism for transmission.

2. The power output apparatus according to claim 1, wherein the transmission control module is further programmed to control the first and second motors, the connecting/disconnecting unit, and the transmission mechanism so that the power based on the set power demand is outputted to the drive shaft while performing a second rotation speed adjustment process for adjusting a rotation speed of one of the first and second motors disconnected from the drive shaft so as to enable the driving source-element connection, and the driving source-element connection in addition to the rotation speed adjustment process, the power transfer process, and the disconnection of the connection between one of the first and second motors and the drive shaft by the transmission mechanism.

3. The power output apparatus according to claim 1, wherein the power transfer process is a process for decreasing the power from one of the first and second motors and increasing the power from the other of the first and second motors so that the power outputted from one of the first and second motors becomes a value 0 and the power outputted from the other of the first and second motors becomes a value based on the power demand and a target speed ratio which is a speed ratio of the transmission mechanism after the connection between one of the first and second motors and the drive shaft has been disconnected at a point of time when a predetermined transfer time has elapsed since a start of the power transfer process.

4. The power output apparatus according to claim 3, wherein the power transfer process is a process for setting a torque command to the first and second motors based on the power outputted by the first and second motors, the power demand set by the power demand setting module and the target speed ratio so that the power based on the set power demand is outputted to the drive shaft all the time during the power transfer process and the transfer of the power is completed within the transfer time.

5. The power output apparatus according to claim 3, wherein the power transfer process is a process for setting a torque command to the first and second motors based on the power outputted by the first and second motors at the start of the power transfer process, the power demand at the start of the power transfer process and the target speed ratio so that the transfer of the power is completed within the transfer time.

6. The power output apparatus according to claim 1, wherein the transmission mechanism further includes a connecting/disconnecting mechanism for transmission capable of a connection between the output element of either one of the first planetary gear mechanism for transmission and the second planetary gear mechanism for transmission and the fixable element and a disconnection of the connection.

7. A hybrid vehicle including a drive wheel driven by power from a drive shaft, the hybrid vehicle comprising:
an internal combustion engine;
a first motor capable of inputting and outputting power;
a second motor capable of inputting and outputting power;
an accumulator unit capable of exchanging electric power with each of the first and second motors;
a power distribution and integration mechanism having a first element connected to a rotating shaft of the first motor, a second element connected to a rotating shaft of the second motor, and a third element connected to an engine shaft of the internal combustion engine, the power distribution and integration mechanism constituted so that each of the first, second, and third elements are capable of mutually differential rotation;
a connecting/disconnecting unit capable of a driving source-element connection and disconnection of the driving source-element connection, the driving source-element connection being any one of a connection between the first motor and the first element, a connection between the second motor and the second element, and a connection between the internal combustion engine and the third element;
a transmission mechanism capable of selectively connecting either one or both of the rotating shaft of the first motor and the rotating shaft of the second motor to the drive shaft, the transmission mechanism further capable of transmitting the power from the first motor and the power from the second motor to the drive shaft at respective predetermined speed ratios;
a power demand setting module for setting power demand, which is power required for the drive shaft; and
a transmission control module programmed to control the first and second motors, the connecting/disconnecting unit, and the transmission mechanism so that power based on the set power demand is outputted to the drive shaft,
wherein the transmission control module is further programmed to control the connecting/disconnecting unit, when the internal combustion engine is stopped, to make the driving source-element connection so that only one of the first and second motors is connected to the drive shaft by the transmission mechanism and the power is outputted by one of the first and second motors,
wherein the transmission control module is still further programmed to control the first and second motors, the connecting/disconnecting unit, and the transmission mechanism so that only the other of said first and second motors is connected to the drive shaft by the transmission mechanism and the power is outputted by the other of the first and second motors while performing the disconnection of the driving source-element connection,
wherein the transmission control module is further programmed to carry out a rotation speed adjustment process for adjusting a rotation speed of the other of the first and second motors to be substantially the same as a rotation speed of the one of the first and second motors, so that the other of the first and second motors can be connected to the drive shaft while the driving source-element connection is disconnected,
wherein the transmission control module is also programmed to carry out a power transfer process for transferring the power from one of the first and second motors to the other while both of the first and second motors are connected to the drive shaft by the transmission mechanism, and
wherein the transmission control module is further programmed to carry out a disconnection of the connection between one of the first and second motors and the drive shaft by the transmission mechanism, and
wherein the transmission mechanism is a planetary gear type transmission including a first planetary gear mechanism for transmission having an input element connected to either one of the first and second elements of the power distribution and integration mechanism, an output element connected to the drive shaft, and a fixable element and constituted so that these three elements are capable of mutually differential rotation, a first fixing mechanism capable of unrotatably fixing the fixable element of the first planetary gear mechanism, a second planetary gear mechanism for transmission having an input element connected to the rotating shaft of the first or second motor corresponding to the other of the first and second elements, an output element connected to the drive shaft, and a fixable element and constituted so that these three elements are capable of mutually differential rotation, and a second fixing mechanism capable of unrotatably fixing the fixable element of the second planetary gear mechanism for transmission.

8. A control method of a power output apparatus including a drive shaft, an internal combustion engine, first and second motors respectively capable of inputting and outputting power, an accumulator unit capable of exchanging electric power with each of the first and second motors, a power distribution and integration mechanism having a first element connected to a rotating shaft of the first motor, a second element connected to a rotating shaft of the second motor, and a third element connected to an engine shaft of the internal combustion engine and constituted so that these three elements are capable of mutually differential rotation, a connecting/disconnecting unit capable of a driving source-element connection and a disconnection of the driving source-element connection, the driving source-element connection being any one of a connection between the first motor and the first element, a connection between the second motor and the second element, and connection between the internal combustion engine and the third element, a transmission mechanism capable of selectively connecting either one or both of the rotating shaft of the first motor and the rotating shaft of the second motor to the drive shaft and of transmitting the power from the first motor and the power from the second motor to the drive shaft at respective predetermined speed ratios, the control method comprising steps of:

(a) when the internal combustion engine is stopped, making the driving source-element connection so that only one of the first and second motors is connected to the drive shaft by the transmission mechanism and so that the power is outputted by one of the first and second motors, disconnecting the driving source-element connection;

(b) adjusting a rotation speed of the other of the first and second motors to be substantially the same as a rotation speed of the one of the first and second motors, so that the other of the first and second motors can be connected to the drive shaft while the driving source-element connection is disconnected;

(c) transferring the power from one of the first and second motors to the other while both the first and second motors are connected to the drive shaft by the transmission mechanism; and (d) disconnecting the connection between one of the first and second motors to the drive shaft by the transmission mechanism, wherein the transmission mechanism is a planetary gear type transmission including a first planetary gear mechanism for transmission having an input element connected to either one of the first and second elements of the power distribution and integration mechanism, an output element connected to the drive shaft, and a fixable element and constituted so that these three elements are capable of mutually differential rotation, a first fixing mechanism capable of unrotatably fixing the fixable element of the first planetary gear mechanism, a second planetary gear mechanism for transmission having an input element connected to the rotating shaft of the first or second motor corresponding to the other of the first and second elements, an output element connected to the drive shaft, and a fixable element and constituted so that these three elements are capable of mutually differential rotation, and a second fixing mechanism capable of unrotatably fixing the fixable element of the second planetary gear mechanism for transmission.

9. The control method of a power output apparatus according to claim 8, the method further comprising steps after the step (d):

(e) adjusting the rotation speed of one of the first and second motors disconnected from the drive shaft; and (f) performing the driving source-element connection.

10. The control method of a power output apparatus according to claim 9, wherein a torque command to the first and second motors is set so that power based on power demand required for the drive shaft is outputted during steps (a) to (f).

11. The control method of a power output apparatus according to claim 8, wherein step (c) decreasing the power from one of the first and second motors and increasing the power from the other of the first and second motors so that the power outputted from one of the first and second motors becomes the value 0 and the power outputted from the other of the first and second motors becomes a value based on the power demand and a target speed ratio which is a speed ratio of the transmission mechanism after connection between one of the first and second motors and the drive shaft is disconnected at a point of time when a predetermined transfer time has elapsed since a start of step (c).

12. The control method of a power output apparatus according to claim 11, wherein step (c) setting a torque command to the first and second motors based on the power outputted from the first and second motors, the power demand and the target speed ratio so that the power based on the power demand is outputted to the drive shaft all the time of step (c), and the transfer of power is completed within the transfer time.

13. The control method of a power output apparatus according to claim 11, wherein step (c) setting a torque command to the first and second motors so that the transfer of power is completed within the transfer time based on the power outputted from the first and second motors at the start of step (c), the power demand at the start of step (c), and the target speed ratio.

* * * * *

UNITED STATES PATENT AND TRADEMARK OFFICE
CERTIFICATE OF CORRECTION

PATENT NO. : 8,272,991 B2  Page 1 of 1
APPLICATION NO. : 12/443842
DATED : September 25, 2012
INVENTOR(S) : Hiroshi Katsuta et al.

It is certified that error appears in the above-identified patent and that said Letters Patent is hereby corrected as shown below:

In the Specifications:

Column 10, line 10, change "the both" to --both--;

Column 22, line 5, change "(=prNm2)" to --(=pr·Nm2)--;

Column 22, equation 6, change "Tm2*=k21(Nm2*-Nm2)+k22·(Nm2*-Nm2)dt" to --Tm2*=k21(Nm2*-Nm2)+k22∫(Nm2*-Nm2)dt--;

Column 23, line 52, change "pr" to --ρr--;

Column 24, equation 8, change "Tm/tag=Tr*/β*" to --Tm/tag=Tr*/γ*--;

Column 24, line 35, change "ration 7*" to --ratio γ*--;

Column 25, line 46, change "pr" to --ρr--;

Column 26, line 21, change "pr" to --ρr--;

Column 29, line 19, change "or the both" to --or both--;

Column 32, line 40, change "the both" to --both--;

Column 32, line 44, change "the both" to --both--;

Column 32, line 47, change "the both" to --both--.

Signed and Sealed this
Twenty-eighth Day of May, 2013

Teresa Stanek Rea
*Acting Director of the United States Patent and Trademark Office*